US012770265B2

(12) United States Patent
Liao et al.

(10) Patent No.: US 12,770,265 B2
(45) Date of Patent: Oct. 20, 2026

(54) SYSTEMS AND METHODS FOR PROCESSING IMAGES

(71) Applicant: ZHEJIANG DAHUA TECHNOLOGY CO., LTD., Hangzhou (CN)

(72) Inventors: Bingyan Liao, Hangzhou (CN); Shiliang Huang, Hangzhou (CN); Yayun Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 347 days.

(21) Appl. No.: 18/412,991

(22) Filed: Jan. 15, 2024

(65) Prior Publication Data

US 2024/0161304 A1 May 16, 2024

Related U.S. Application Data

(63) Continuation of application No. PCT/CN2021/141555, filed on Dec. 27, 2021.

(30) Foreign Application Priority Data

Jul. 15, 2021 (CN) ......................... 202110802881.9

(51) Int. Cl.
*G06T 7/11* (2017.01)
*G06V 10/40* (2022.01)
*G06V 10/74* (2022.01)

(52) U.S. Cl.
CPC ................ *G06T 7/11* (2017.01); *G06V 10/40* (2022.01); *G06V 10/761* (2022.01)

(58) Field of Classification Search
CPC ........ G06T 7/11; G06V 10/40; G06V 10/761; G06V 10/806; G06V 10/26; G06V 20/70;
(Continued)

(56) References Cited

U.S. PATENT DOCUMENTS 12,493,972 B2 * 12/2025 De Nigris .............. G01B 11/00
2020/0134772 A1 * 4/2020 Poudel Karmatha ........................ G06N 3/0495

(Continued)

FOREIGN PATENT DOCUMENTS

CN 110782397 A 2/2020
CN 111143146 A 5/2020

(Continued)

OTHER PUBLICATIONS

International Search Report in PCT/CN2021/141555 mailed on Mar. 28, 2022, 4 pages.

(Continued)

*Primary Examiner* — Utpal D Shah
(74) *Attorney, Agent, or Firm* — METIS IP LLC

(57) ABSTRACT

Embodiments of the present disclosure disclose a system for processing an image. The system comprises at least one storage device including a set of instructions; and at least one processor configured to communicate with the at least one storage device, wherein when executing the set of instructions, the at least one processor is configured to direct the system to perform operations including: obtaining an image; obtaining a first image feature by performing a feature extraction operation on the image; obtaining a down-sampled image by down-sampling the image; obtaining a second image feature by performing a feature extraction operation on the down-sampled image; obtaining, based on the first image feature and the second image feature, a target feature; and performing a segmentation operation on the image based on the target feature.

14 Claims, 16 Drawing Sheets

300

(58) Field of Classification Search
CPC ...... G06V 10/82; G06N 3/048; G06N 3/0464; G06N 3/045; G06N 3/08; G06F 18/253
See application file for complete search history.

(56) References Cited

U.S. PATENT DOCUMENTS

| | | | |
|---|---|---|---|
| 2020/0134797 A1 | 4/2020 | Zhang et al. | |
| 2020/0167929 A1 | 5/2020 | Wang | |
| 2020/0364870 A1* | 11/2020 | Lee | G06N 3/045 |
| 2020/0364910 A1* | 11/2020 | Price | G06T 11/00 |
| 2021/0397822 A1* | 12/2021 | Zhang | G06V 10/82 |
| 2022/0319155 A1* | 10/2022 | Lu | G06N 3/0455 |
| 2023/0401838 A1* | 12/2023 | Chen | G06V 10/7715 |
| 2026/0024237 A1* | 1/2026 | Zhang | G06T 11/00 |

FOREIGN PATENT DOCUMENTS

| | | | |
|---|---|---|---|
| CN | 111311609 | A | 6/2020 |
| CN | 111387974 | A | 7/2020 |
| CN | 111401380 | A | 7/2020 |
| CN | 111784623 | A | 10/2020 |
| CN | 111931841 | A | 11/2020 |
| CN | 111951164 | A | 11/2020 |
| CN | 112560864 | A | 3/2021 |
| CN | 113034506 | A | 6/2021 |
| CN | 113055676 | A | 6/2021 |
| WO | 2023284255 | A1 | 1/2023 |

OTHER PUBLICATIONS

Written Opinion in PCT/CN2021/141555 mailed on Mar. 28, 2022, 5 pages.

The Extended European Search Report in European Application No. 21950026.1 mailed on Sep. 23, 2024, 8 pages.

Zhan, Wei et al., Multi-spectral infrared ship image multi-level fusion method, Laser&Infrared, 49(2): 240-245, 2019.

Xu, Lingli et al., Culvert Crack Defect Segmentation Algorithm Based on Enhanced Hue Features, Laser & Optoelectronics Progress, 2020, 8 pages.

Qi, Gege et al., Self-Learned Feature Reconstruction and Offset-Dilated Feature Fusion for Real-Time Semantic Segmentation, 2019 IEEE 31st International Conference on Tools with Artificial Intelligence, 331-338, 2019.

* cited by examiner

300

SYSTEMS AND METHODS FOR PROCESSING IMAGES

CROSS-REFERENCE TO RELATED APPLICATIONS

The present application is a continuation of International Application No. PCT/CN2021/141555, filed on Dec. 27, 2021, which claims priority to Chinese Patent Application No. 202110802881.9, filed on Jul. 15, 2021, the entire contents of each of which are hereby incorporated by reference.

TECHNICAL FIELD

The present disclosure generally relates to the technical field of image processing technology, and more particularly, relates to systems and methods for image segmentation.

BACKGROUND

Image segmentation is basic preprocessing work for tasks such as image recognition, scene understanding, object detection, or the like. The accuracy of image segmentation may affect the application of subsequent tasks such as image recognition and scene understanding. Therefore, it is desirable to provide systems and methods for processing images to improve the accuracy of image segmentation.

SUMMARY

One aspect of the present disclosure may provide a system for processing an image. The system may comprise at least one storage device including a set of instructions; and at least one processor configured to communicate with the at least one storage device, wherein when executing the set of instructions, the at least one processor is configured to direct the system to perform operations including: obtaining an image; obtaining a first image feature by performing a feature extraction operation on the image; obtaining a down-sampled image by down-sampling the image; obtaining a second image feature by performing a feature extraction operation on the down-sampled image; obtaining, based on the first image feature and the second image feature, a target feature; and performing a segmentation operation on the image based on the target feature.

In some embodiments, the obtaining a target feature may comprise: obtaining a first intermediate feature by up-sampling the first image feature; obtaining a second intermediate feature by up-sampling the second image feature; obtaining a semantic feature by performing a fusion operation on the first intermediate feature and the second intermediate feature; and obtaining the target feature based on the semantic feature.

In some embodiments, the obtaining a semantic feature by performing a fusion operation on the first intermediate feature and the second intermediate feature may comprise: obtaining a first probability map corresponding to the first intermediate feature and a second probability map corresponding to the second intermediate feature; and obtaining the semantic feature by performing a weighted summation on the first intermediate feature and the second intermediate feature based on the first probability map and the second probability map.

In some embodiments, the obtaining the target feature based on the semantic feature may comprise: obtaining a difference feature based on the first intermediate feature and the second intermediate feature; and obtaining the target feature based on the difference feature and the semantic feature.

In some embodiments, the obtaining a difference feature based on the first intermediate feature and the second intermediate feature may comprise obtaining difference information between the first intermediate feature and the second intermediate feature; and obtaining the difference feature by performing a convolution operation on the difference information.

In some embodiments, the obtaining the target feature based on the difference feature and the semantic feature may comprise: obtaining a basic feature based on the image; and obtaining the target feature by performing a detail enhancement operation on the semantic feature based on the basic feature and the difference feature.

In some embodiments, the performing a detail enhancement operation on the semantic feature based on the basic feature and the difference feature may comprise: obtaining an offset matrix based on the basic feature and the difference feature; and performing the detail enhancement operation on the semantic feature based on the offset matrix.

In some embodiments, the performing the detail enhancement operation on the semantic feature based on the offset matrix may comprise: for each element in the semantic feature, obtaining an element in the offset matrix corresponding to the element in the semantic feature, the element in the offset matrix and the corresponding element in the semantic feature having the same position coordinates in the offset matrix and the semantic feature; and obtaining the target feature by offsetting an element position of the element in the semantic feature based on an element value of the corresponding element in the offset matrix.

In some embodiments, the obtaining, based on the first image feature and the second image feature, a target feature may further comprise: obtaining a difference feature based on the first image feature and the second image feature; obtaining a basic feature based on the image; and obtaining the target feature by performing an enhancement operation on the first image feature based on the basic feature and the difference feature.

Another aspect of the present disclosure may provide a method for processing an image implemented on a computing device including at least one processor and a storage device. The method may comprise: obtaining an image; obtaining a first image feature by performing a feature extraction operation on the image; obtaining a down-sampled image by down-sampling the image; obtaining a second image feature by performing a feature extraction operation on the down-sampled image; obtaining, based on the first image feature and the second image feature, a target feature; and performing a segmentation operation on the image based on the target feature.

In some embodiments, the obtaining a target feature may comprise: obtaining a first intermediate feature by up-sampling the first image feature; obtaining a second intermediate feature by up-sampling the second image feature; obtaining a semantic feature by performing a fusion operation on the first intermediate feature and the second intermediate feature; and obtaining the target feature based on the semantic feature.

In some embodiments, the obtaining a semantic feature by performing a fusion operation on the first intermediate feature and the second intermediate feature may comprise: obtaining a first probability map corresponding to the first intermediate feature and a second probability map corresponding to the second intermediate feature; and obtaining the semantic feature by performing a weighted summation on the first intermediate feature and the second intermediate feature based on the first probability map and the second probability map.

In some embodiments, the obtaining the target feature based on the semantic feature may comprise: obtaining a difference feature based on the first intermediate feature and the second intermediate feature; and obtaining the target feature based on the difference feature and the semantic feature.

In some embodiments, the obtaining a difference feature based on the first intermediate feature and the second intermediate feature may comprise obtaining difference information between the first intermediate feature and the second intermediate feature; and obtaining the difference feature by performing a convolution operation on the difference information.

In some embodiments, the obtaining the target feature based on the difference feature and the semantic feature may comprise: obtaining a basic feature based on the image; and obtaining the target feature by performing a detail enhancement operation on the semantic feature based on the basic feature and the difference feature.

In some embodiments, the performing a detail enhancement operation on the semantic feature based on the basic feature and the difference feature may comprise: obtaining an offset matrix based on the basic feature and the difference feature; and performing the detail enhancement operation on the semantic feature based on the offset matrix.

In some embodiments, the performing the detail enhancement operation on the semantic feature based on the offset matrix may comprise: for each element in the semantic feature, obtaining an element in the offset matrix corresponding to the element in the semantic feature, the element in the offset matrix and the corresponding element in the semantic feature having the same position coordinates in the offset matrix and the semantic feature; and obtaining the target feature by offsetting an element position of the element in the semantic feature based on an element value of the corresponding element in the offset matrix.

In some embodiments, the obtaining, based on the first image feature and the second image feature, a target feature may further comprise: obtaining a difference feature based on the first image feature and the second image feature; obtaining a basic feature based on the image; and obtaining the target feature by performing an enhancement operation on the first image feature based on the basic feature and the difference feature.

Another aspect of the present disclosure may provide a non-transitory computer-readable medium, comprising at least one set of instructions, wherein when executed by at least one processor of a computer device, the at least one set of instructions directs the at least one processor to perform operations including: obtaining an image; obtaining a first image feature by performing a feature extraction operation on the image; obtaining a down-sampled image by down-sampling the image; obtaining a second image feature by performing a feature extraction operation on the down-sampled image; obtaining, based on the first image feature and the second image feature, a target feature; and performing a segmentation operation on the image based on the target feature.

In some embodiments, the obtaining a target feature may comprise: obtaining a first intermediate feature by up-sampling the first image feature; obtaining a second intermediate feature by up-sampling the second image feature; obtaining a semantic feature by performing a fusion operation on the first intermediate feature and the second intermediate feature; and obtaining the target feature based on the semantic feature.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
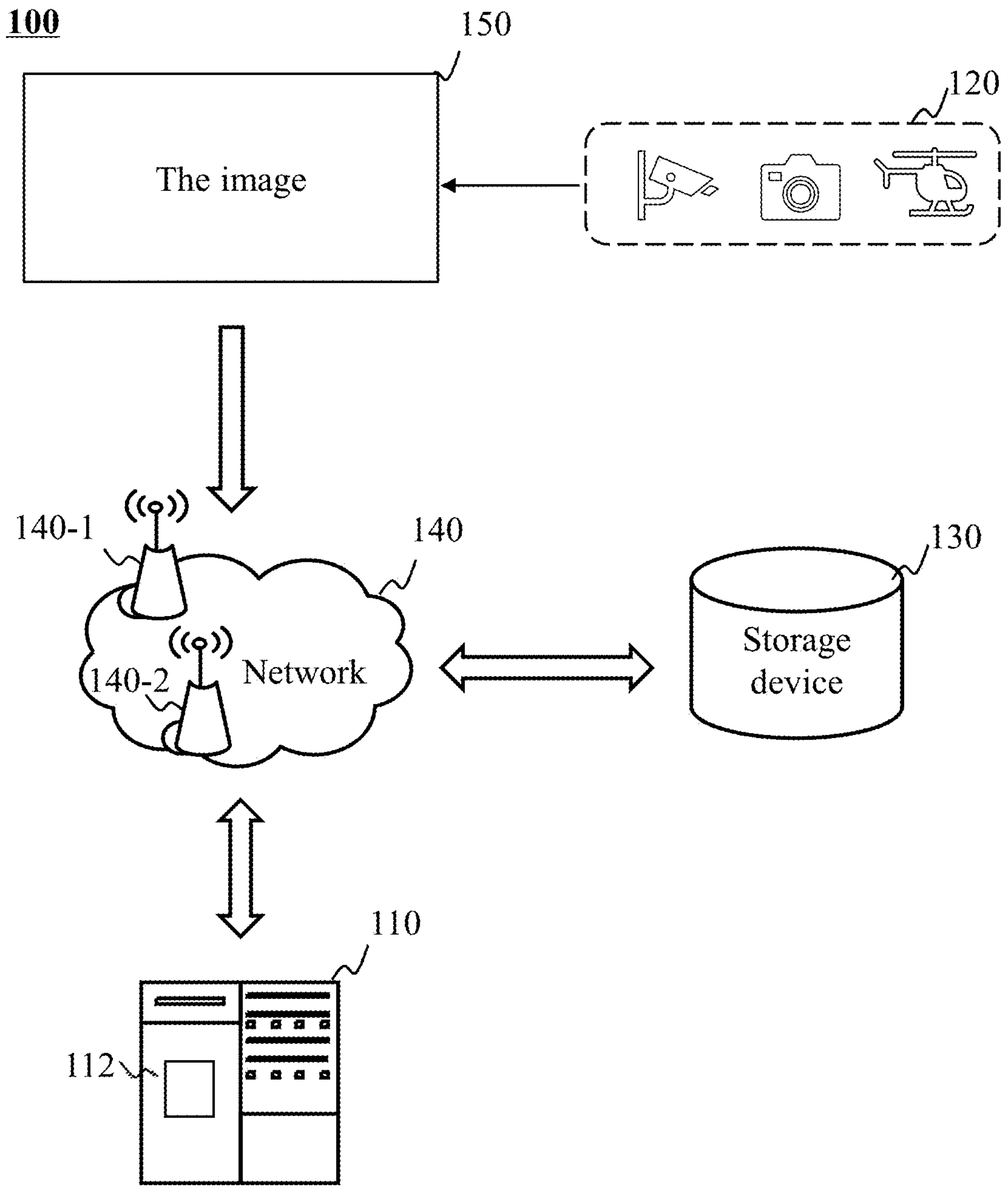
FIG. 1 is a schematic diagram illustrating an application scenario of an exemplary image processing system according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the term "system," "device," "unit," and/or "module" used herein are one method to distinguish different components, elements, parts, sections or assembly of different levels in ascending order. However, the terms may be displaced by another expression if they achieve the same purpose.

It will be understood that, the singular forms "a," "an," and "the" may be intended to include the plural forms as well, unless the context clearly indicates otherwise. In general, the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

At present, in an image segmentation task, it is usually necessary to combine high-dimensional semantic information with low-dimensional detailed information (e.g., edges, textures, etc.). The semantic information may be distributed in high-dimension features extracted from the image, and the detailed information may be distributed in shallow features extracted from the image. In some embodiments, semantic information may be combined with detailed information by splicing shallow features with high-dimension features. However, the directly splicing between the shallow features with high-dimension features may introduce more errors in the shallow features, which will be enlarged in the subsequent feature processing (e.g., the error may be enlarged in the process of feature up-sampling, which will further affect the accuracy of subsequent segmentation), resulting in segmentation errors in some fuzzy regions of the image and reducing the segmentation accuracy.

In some embodiments, the image segmentation may be performed by a main network that includes one or more layers. The shallow features may be extracted by one or more layers that are closer to an input end of the main network when the image is segmented through the main network. For example, the shallow features may be obtained after the input image is processed by a first and/or second convolutional layer of the main network. The high-dimension features may be extracted by one or more layers that are closer to an output end of the main network when the image is segmented through the main network. For example, the high-dimension features may be obtained after the input image is processed by the last and/or the penultimate convolutional layer of the main network.

In order to solve segmentation errors caused by directly splicing shallow features with high-dimension features, the present disclosure provides a method for processing an image, which improves the accuracy of subsequent segmentation by enhancing the features of the extracted image features. The method provided in the present disclosure may be widely used in various image processing scenarios, such as a medical image processing scenario, a remote sensing image processing scenario, etc. In the medical image processing scenario, the method may be used for measuring volumes of tissues in a medical image, three-dimensional reconstruction, or surgical simulation, etc. In the remote sensing image processing scenario, the method may be used to segment objects in synthetic aperture radar images, extract different cloud systems and backgrounds in remote sensing cloud images, locate roads and forests in satellite images, or the like. Image segmentation may also be used as preprocessing to convert an initial image into several forms that are convenient for computer processing, which not only retains important feature information in the image but also effectively reduces useless data in the image and improves the accuracy and efficiency of subsequent image processing. For example, in a communication scenario, image segmentation may extract a contour structure of an object, regional content, or the like, which may ensure that useful information is not lost while compressing the image in a targeted manner to improve the efficiency of the network transmission. In a transportation scenario, image segmentation may be used to extract, identify, and/or track contours of vehicles, and/or to detect pedestrians. In general, all the scenarios related to object detection, object extraction, and object recognition may need to use image segmentation techniques.

The technical solutions disclosed in the present disclosure may be described in detail below through the description of the drawings.

FIG. 1 is a schematic diagram illustrating an exemplary image processing system according to some embodiments of the present disclosure.

As shown in FIG. 1, the image processing system 100 may include a server 110, an image acquisition device 120, a storage device 130, and a network 140.

The server 110 may be configured to manage resources and process data and/or information from at least one component of the system or an external data source (e.g., a cloud data center). The server 110 may execute program instructions based on the data, information, and/or processing results to perform one or more functions described in the present disclosure. In some embodiments, the server 110 may be a single server or a server group. The server group may be centralized or distributed (e.g., the server 110 may be a distributed system). In some embodiments, the server 110 may be dedicated or may provide services for other devices or systems at the same time.

In some embodiments, the server 110 may include a processing device 112. The processing device 112 may process data and/or information obtained from components of the system and/or other devices. The processing device 112 may execute program instructions based on the data, information, and/or processing results to perform one or more functions described in the present disclosure. For example, the processing device 112 may obtain an image (e.g., an image 150) and perform feature extraction based on the image to obtain image features, for example, a first image feature and a second image feature. The processing device 112 may also process the image features (e.g., the first image feature and the second image feature) to obtain a target feature and perform a segmentation operation on the image based on the target feature. The image 150 may include various types of images (e.g., a visible light image, an infrared image, or the like). In some embodiments, the image 150 may be acquired by the image acquisition device 120. In some embodiments, the processing device 112 may be integrated into the server 110 or the image acquisition device 120.

The image acquisition device 120 may include various types of devices capable of capturing images and/or video. The image acquisition device 120 may be configured to monitor a specific area (e.g., a community, a school, a shopping mall, a parking area, etc.). For example, the image acquisition device 120 may be configured to acquire the image 150 and monitor a specific area based on the acquired image 150. For example, the server 110 may perform an image segmentation operation on the image 150 to obtain a segmentation result by implementing the technical solution disclosed in the present disclosure and determine whether an abnormality exists in the image 150 based on the segmentation result. When an abnormality is determined based on the images or video captured by the image acquisition device 120, the server 110 may promptly provide feedback. For example, the server 110 may report to the police or call the security guard. The image acquisition device 120 may include a camera, a visible light sensor, an infrared sensor, an electromagnetic wave sensor, or the like, or any combination thereof. In some embodiments, the image acquisition device 120 may be carried by a mobile platform or a fixed platform. For example, the platform may include but is not limited to a drone, a balloon, a vehicle, a building, a high tower, etc.

The storage device 130 may be configured to store data and/or instructions. The storage device 130 may include one or more storage components, and each storage component may be an independent device or a part of other devices. For example, the storage device 130 may be integrated into the server 110 or the image acquisition device 120.

The network 140 may be configured to connect various components of the system and/or connect the system and external resource parts. The network 140 may enable communication between various components of the system and between the system and other parts outside the system, and facilitate the exchange of data and/or information. In some embodiments, the network 140 may be one or more of a wired network or a wireless network. In some embodiments, the network may include a topological structure such as a point-to-point structure, a shared structure, a centralized structure, or the like, or any combination thereof. In some embodiments, the network 140 may include one or more network access points. For example, the network 140 may include wired and/or wireless network access points such as base stations and/or internet exchange points 140-1, 140-2, . . . , through which one or more components of the system may be connected to the network 140 to exchange data and/or information.

The server 110 may communicate with the processing device 112, the image acquisition device 120, and the storage device 130 via the network 140 to acquire data and/or information. The server 110 may execute program instructions based on the acquired data, information, and/or processing results to acquire the target detection result. The storage device 130 may store various data and/or information in the operations of the image processing method. The information transfer relationship between the above devices may be only taken as an example and not be limited in the present disclosure.

Figure 2:
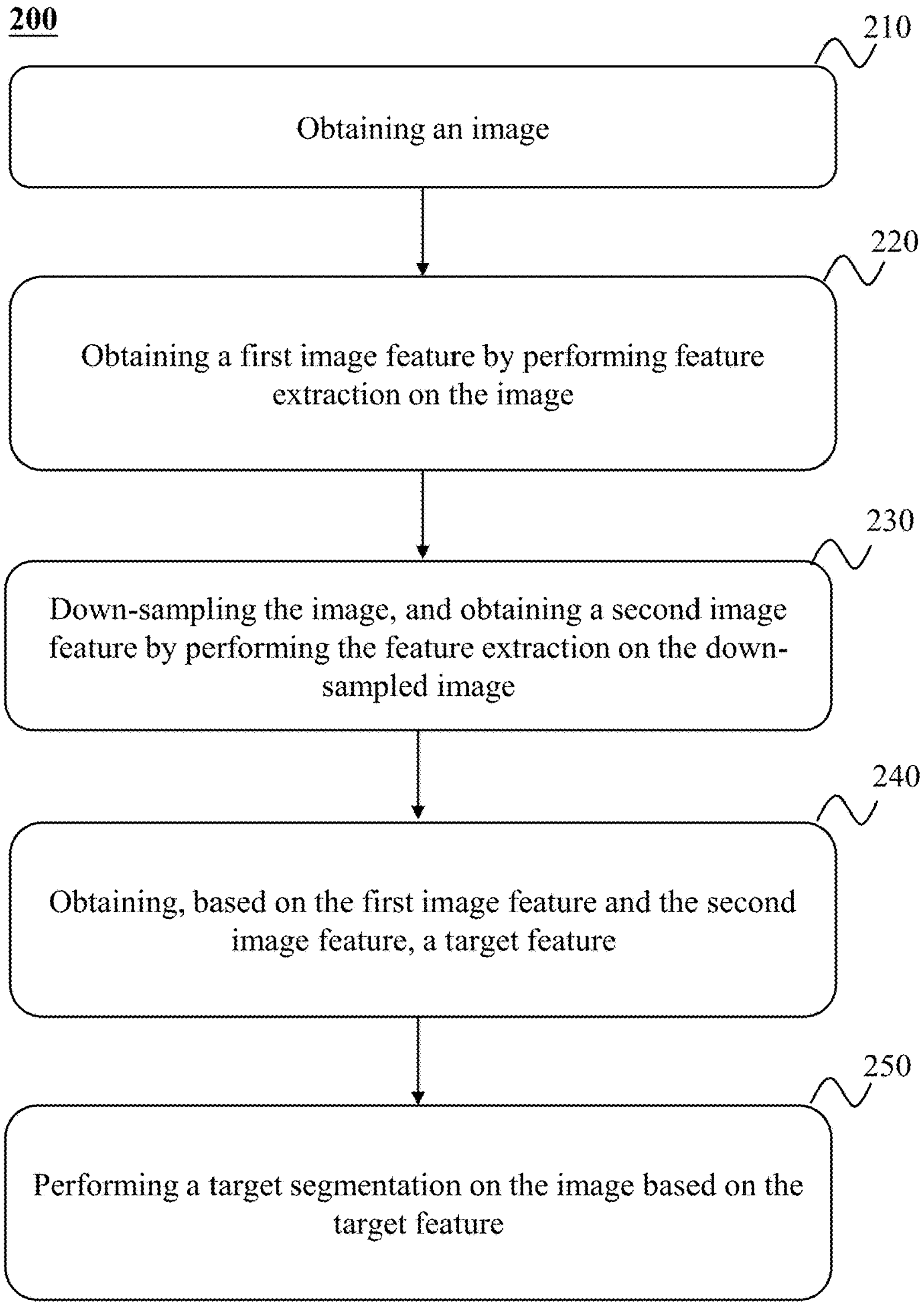
FIG. 2 is a flowchart illustrating an exemplary process for processing an image according to some embodiments of the present disclosure.

FIG. 2 is a flowchart illustrating an exemplary process for processing an image according to some embodiments of the present disclosure. In some embodiments, the process 200 may be executed by a processing device (e.g., the processing device 112). For example, the process 200 may be stored in a storage device (such as a built-in storage unit of the processing device or an external storage device) in the form of a program or an instruction. When the program or instruction is executed, the process 200 may be implemented. The process 200 may include the following operations.

In 210, an image of an object may be obtained. In some embodiments, operation 210 may be performed by an image acquisition module.

The image of the object may include a representation of the object. The object may include a person, an animal, an architecture, a vehicle, etc. In some embodiments, the image may include a landscape image, a person image, an architecture image, or the like.

In some embodiments, the image may include a visible light image, an infrared image, a satellite cloud image, an X-ray image, or the like.

In some embodiments, the image may be a preprocessed image, for example, an image after being denoised.

In some embodiments, the image may be acquired by an image acquisition device (e.g., the image acquisition device 120). In some embodiments, the processing device may obtain the image from the image acquisition device (e.g., the image acquisition device 120). In some embodiments, the processing device may obtain the image by reading from a database or a storage device, calling related data interfaces, or the like.

In some embodiments, the processing device may obtain the image from a video acquired by the image acquisition device. For example, an image may be obtained from video frames that are generated by performing a framing operation on the video acquired by the image acquisition device.

In 220, a first image feature may be obtained by performing a feature extraction operation on the image. In some embodiments, operation 220 may be performed by a feature extraction module.

Feature extraction refers to a process or an operation of extracting feature information from an image through a computer device (e.g., the processing device).

In some embodiments, the processing device may extract the first image feature by processing the image using a feature extraction network.

In some embodiments, the feature extraction network model may be obtained through training a preliminary network based on a plurality of sample images. For example, during the training of the preliminary network model, a sample image may be used as an input of the preliminary network model, and an image feature corresponding to the sample image may be used as a training label. The image feature corresponding to the sample image may be extracted from the sample image based on an image feature extraction algorithm (e.g., a histogram oriented gradient (HOG) extraction algorithm, a local binary pattern (LBP) extraction algorithm, a Harr-like feature extraction algorithm). The preliminary network model may be trained using a model training algorithm (e.g., a gradient descent algorithm). Then the trained feature extraction network model may be obtained.

In some embodiments, the feature extraction network model may include residual networks (ResNets), high resolution networks (HRNet), a twin network, or other network models that have a feature extraction function. The twin network may share parameters.

In some embodiments, the feature extraction network model may include N convolutional layers sequentially connected in series. The m-th convolutional layer may be a convolutional layer among the N convolutional layers, where N is an integer greater than 1, and m is a positive integer less than N. In some embodiments, the m-th convolutional layer may be one or more convolutional layers that are close to the input end of the feature extraction network model among all the convolutional layers. For example, assuming that the feature extraction network model includes 7 convolutional layers sequentially connected in series, the value of m may be to 1, 2, or 3.

In 230, the image may be down-sampled and a second image feature may be obtained by performing a feature extraction operation on the down-sampled image. In some embodiments, operation 230 may be performed by the feature extraction module.

Down-sampling refers to an interval sampling of pixel values of the image. For example, a resolution size of an image is 300*300, which means that the count of pixels in each row and column is 300. If the image is sampled at an interval of 1 pixel, an image with a resolution of 150*150 may be obtained. As another example, if the image is sampled at an interval of 2 pixels, an image with a resolution size of 100*100 may be obtained.

In some embodiments, the processing device may down-sample the image according to a certain sampling magnification (e.g., k) to obtain the down-sampled image. For example, assuming that the size of the image is M×N and the image is down-sampled according to k sampling magnifications, that is, all pixels in a sampling window with size k×k in the image may be sampled as one pixel (e.g., averaging pixel values of the pixels in the sampling window with size k×k). The down-sampled image may be obtained, and the size of the down-sampled image may be (M/k)×(N/k).

In some embodiments, the processing device may obtain the second image feature by performing a feature extraction operation on the down-sampled image using the feature extraction network model. In some embodiments, the feature extraction network model used to extract the first image feature may be same as the feature extraction network model used to extract the second image feature. In some embodiments, the feature extraction network model used to extract the first image feature may be different from the feature extraction network model used to extract the second image feature.

In 240, a target feature may be obtained based on the first image feature and the second image feature. In some embodiments, operation 240 may be performed by a feature enhancement module.

The target feature refers to a desired image feature that contains high-dimensional semantic information and low-dimensional detailed information.

In some embodiments, the processing device may obtain the target feature in a plurality of ways based on the first image feature and the second image feature. Merely by way of example, the processing device may obtain a difference feature based on the first image feature and the second image feature and obtain the target feature based on the difference feature. In some embodiments, the processing device may obtain the difference feature by subtracting the first image feature by the second image feature. In some embodiments, the processing device may obtain a first up-sampled feature by up-sampling the first image feature and obtain a second up-sampled feature by up-sampling the second image feature. The processing device may obtain the difference feature by subtracting the first up-sampled feature by the second up-sampled feature. In some embodiments, the processing device may obtain a basic feature (also referred to as a third image feature) based on the image. The processing device may then obtain the target feature based on the difference feature and the basic feature.

In some embodiments, the processing device may obtain a first intermediate feature (e.g., the first up-sampled feature) based on the first image feature and a second intermediate feature (e.g., the second up-sampled feature) based on the second image feature, and obtain the target feature based on the first intermediate feature and the second intermediate feature. For example, the processing device may perform a fusion operation on the first intermediate feature and the second intermediate feature and obtain the target feature based on the result of the fusion. Since the first image feature is extracted from the original image (without down-sampling processing) and the second image feature is extracted from the down-sampled image, which has a different resolution from the original image, the image features (i.e., the first image feature and the second image feature) extracted through the feature extraction network model may also be different. The difference between the two different image features (i.e., the first image feature and the second image feature) may reflect a degree of information loss in the image up-sampling or down-sampling process. In this way, the information loss in the image sampling process may be simulated and the lost information may be supplemented purposefully, which may improve the accuracy of subsequent segmentation. More descriptions regarding obtaining the target feature may be found elsewhere in the present disclosure, for example, FIG. 3 and the descriptions thereof.

Figure 3:
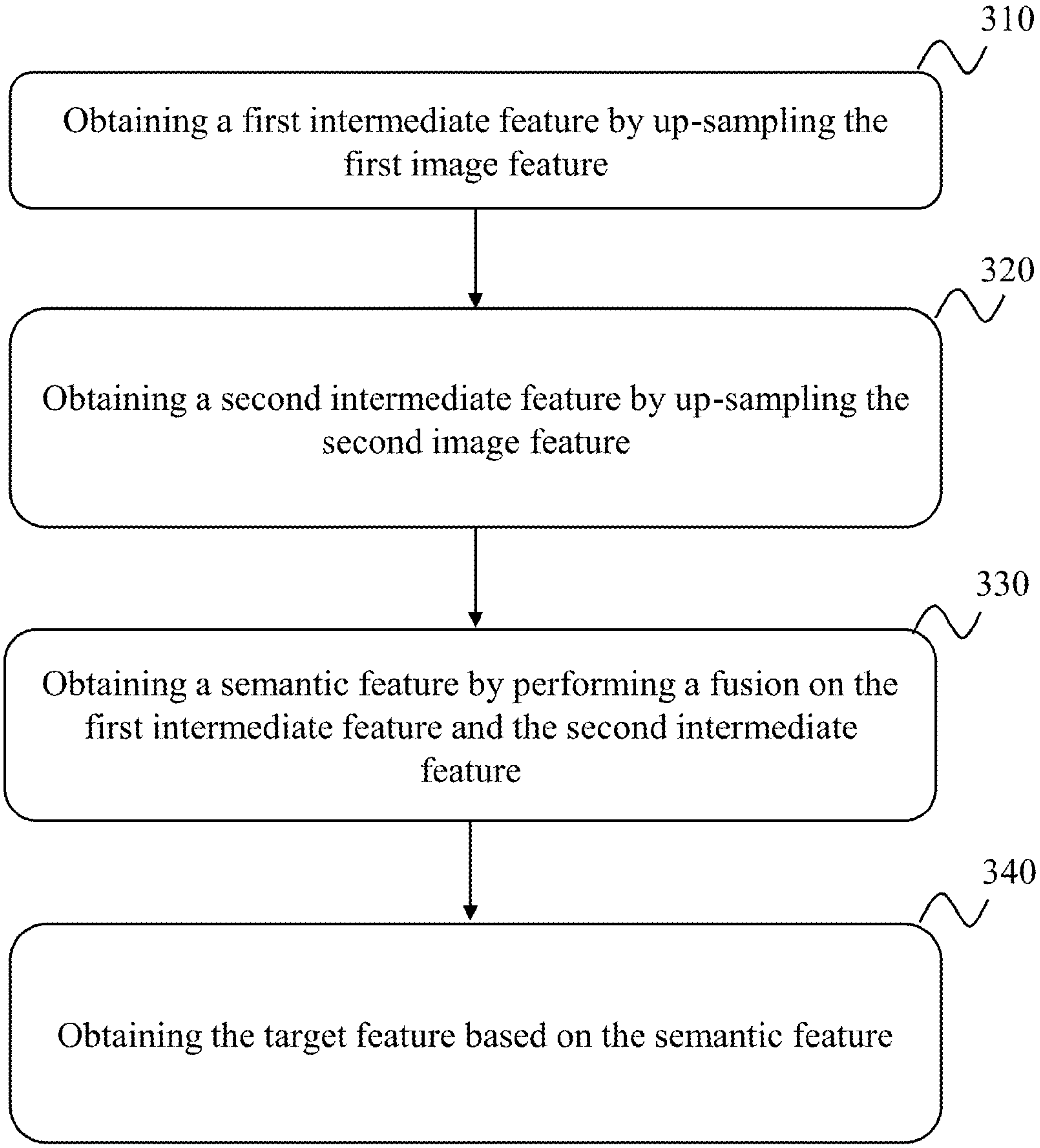
FIG. 3 is a flowchart illustrating an exemplary process for obtaining a target feature according to some embodiments of the present disclosure.
Figure 4:
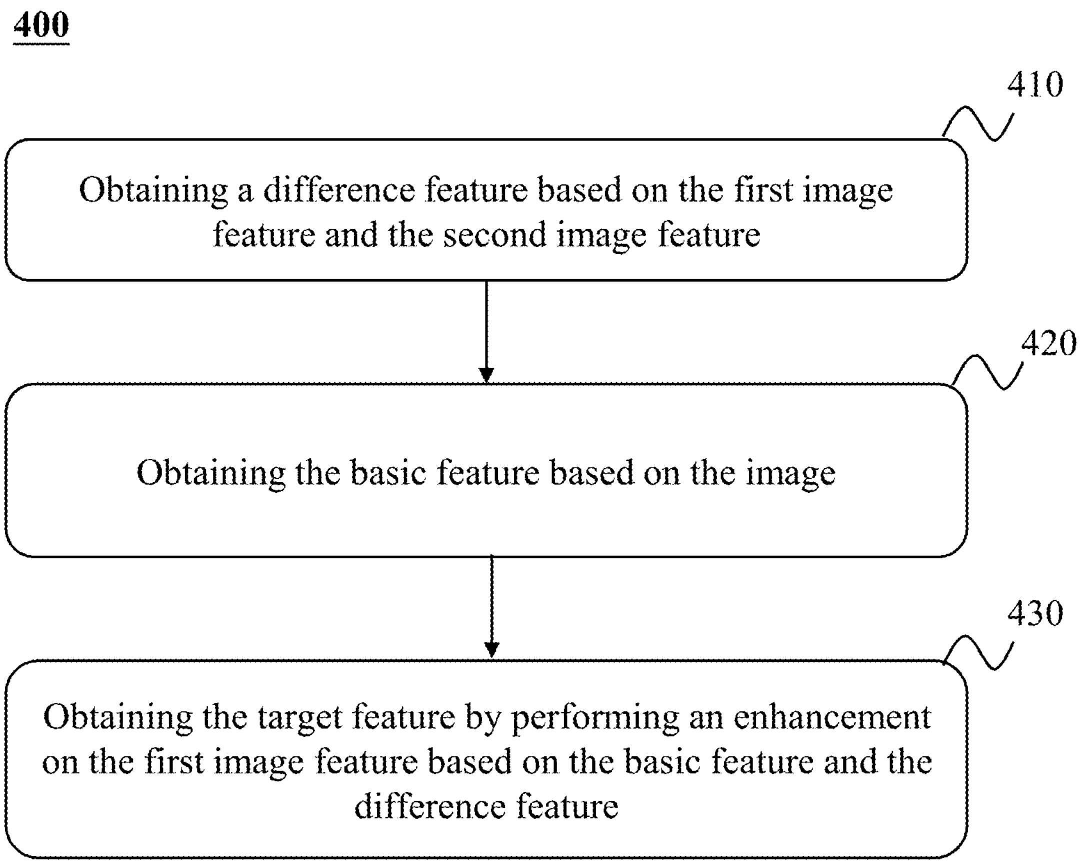
FIG. 4 is a flowchart illustrating an exemplary process for obtaining a target feature according to some embodiments of the present disclosure.

More descriptions regarding the difference feature, the basic feature, and the obtaining of the target feature may be found elsewhere in the present disclosure, for example, FIG. 3 and FIG. 4 and the descriptions thereof.

In 250, an object segmentation operation may be performed on the image based on the target feature. In some embodiments, operation 250 may be performed by an image segmentation module.

Object segmentation refers to identifying and distinguishing the corresponding part of the object from other parts in the image. The object may include a human, a vehicle, a building, a tree, a road, a river, etc.

In some embodiments, the processing device may perform the object segmentation operation on the image using an object segmentation network model based on the target feature. For example, in some embodiments, the processing device may process the image to extract image features using the feature extraction network model, obtain the target feature by processing the image features extracted by the feature extraction network model using the object segmentation network model, and perform the object segmentation operation on the image based on the target feature. The object segmentation network model may be pre-trained through a model training technique, which will not be repeated here.

In some embodiments, the object segmentation network model and the feature extraction network model may be two parts of an object detection model. For example, the feature extraction network model may be one or more layers of the object detection model and the object segmentation network model may be other layers of the object detection model. In some embodiments, the object segmentation network model and the feature extraction network model may be two independent models. In some embodiments, the two independent models (i.e., the object segmentation network model and the feature extraction network model) may be trained jointly. In some embodiments, the two independent models (i.e., the object segmentation network model and the feature extraction network model) may be trained separately.

In some embodiments of the present disclosure, feature extraction may be performed on an image and a down-sampled image obtained by down-sampling the image. The extracted image features from the image and the down-sampled image may be fused, so the information loss in the image sampling process may be simulated and the lost information may be supplemented purposefully. Object segmentation may be performed based on the target feature after the lost information is supplemented, which improves the accuracy of the object segmentation.

FIG. 3 is a flowchart illustrating an exemplary process for obtaining a target feature according to some embodiments of the present disclosure. In some embodiments, the process 300 may be executed by a processing device (e.g., the processing device 112). For example, the process 300 may be stored in a storage device (such as a built-in storage unit of the processing device or an external storage device) in the form of a program or an instruction. When the program or instruction is executed, the process 300 may be implemented. Operation 240 as described in FIG. 2 may be performed according to process 300. The process 300 may include the following operations.

In 310, a first intermediate feature may be obtained based on a first image feature. Operation 310 may be performed by a feature extraction module. The first image feature may be obtained as described in connection with operation 220 in FIG. 2.

In some embodiments, the processing device may obtain the first intermediate feature by up-sampling the first image feature. For example, the processing device may obtain the first intermediate feature (e.g., the first up-sampled feature) by up-sampling the first image feature according to a first sampling magnification (e.g., m sampling magnifications).

In 320, a second intermediate feature may be obtained based on the second image feature. Operation 320 may be performed by the feature extraction module. The first image feature may be obtained as described in connection with operation 230 in FIG. 2.

In some embodiments, the processing device may obtain the second intermediate feature by up-sampling the second image feature. For example, the processing device may obtain the second intermediate feature by up-sampling the second image feature according to a second sampling magnification (e.g., n sampling magnifications). In some embodiments, the first sampling magnification may be equal to the second sampling magnification. In some embodiments, the first sampling magnification may be less than the second sampling magnification. In some embodiments, the first sampling magnification may exceed the second sampling magnification.

In some embodiments, the resolution of the first intermediate feature and the resolution of the second intermediate feature may be the same. The resolution refers to the size of the feature. The first intermediate feature and the second intermediate feature may be sampled to a same resolution, which can facilitate subsequent calculations. In some embodiments, the processing device may also only up-sample the first image feature or the second image feature. For example, in some embodiments, when the resolution of the first image feature is greater than that of the second image feature, the second image feature may be up-sampled to obtain the second intermediate feature, and the first image feature may be directly used as the first intermediate feature, such that the resolution of the second intermediate feature is the same as that of the first intermediate feature. When the resolution of the first image feature is smaller than that of the second image feature, the first image feature may be up-sampled to obtain the first intermediate feature, and the second image feature may be directly used as the second intermediate feature, such that the resolution of the second intermediate feature is the same as that of the first intermediate feature.

In some embodiments, the image feature may be represented as an image (i.e., feature image), the dimension of the image feature may be understood as a count of layers of the feature image representing the image feature, and the resolution of the image feature may represent the size of the feature image (the height and width of the feature image). For example, the first image feature may be represented by $\mathbb{R}^{C\times H\times W}$, where c denotes the dimension of the image feature, and H×W denotes the height and width of the feature image.

In some embodiments, the resolution of the first intermediate feature and the resolution of the second intermediate feature may also be different. For example, the first image feature and the second image feature may be up-sampled according to different sampling magnifications to obtain the first intermediate feature and the second intermediate feature with different resolutions.

In 330, a semantic feature may be obtained by performing a fusion operation on the first intermediate feature and the second intermediate feature.

It can be understood that after the first image feature and the second image feature are up-sampled, the high-dimensional semantic information of the image feature may be enriched. In some embodiments, the image feature may be feature information (e.g., gray value of the image, texture of the image, or the like) of the image. The fusion of the first intermediate feature and the second intermediate feature may realize the semantic enhancement of the first image feature and the second image feature.

The fusion refers to fusing two or more features into one feature. For example, if the first intermediate feature and the second intermediate feature are fused into one feature, the fused feature may be used as the semantic feature.

In some embodiments, the processing device may directly add the first intermediate feature and the second intermediate feature to obtain the semantic feature.

In some embodiments, the processing device may fuse the first intermediate feature and the second intermediate feature in a weighted summation manner to obtain the semantic feature. For example, $F'_I$ denotes the first intermediate feature, $F'_{I_k}$ denotes the second intermediate feature, the weight corresponding to the first intermediate feature may be denoted as a, and the weight corresponding to the second intermediate feature may be denoted as (1−a), then the formula for the weighted summation may be expressed as a Fi'+(1−a) Fik'=$F_a$, where, $F_a$ denotes the semantic feature.

In some embodiments, the processing device may perform the fusion based on the importance of each element of the first intermediate feature and the second intermediate feature to obtain the semantic feature. The exemplary process may be as shown in the following embodiments.

In some embodiments, the processing device may obtain a first probability map corresponding to the first intermediate feature and a second probability map corresponding to the second intermediate feature.

A probability map corresponding to an intermediate feature may reflect an importance of each element of the feature. The probability map corresponding to an intermediate feature may have multiple probabilities each of which may correspond to one element of the intermediate feature. In some embodiments, the intermediate feature may be denoted as a matrix (e.g., a three-dimensional matrix). The probability map may be a matrix with the same size as that of the corresponding intermediate feature. The probability map and the corresponding intermediate feature have the same size, that is, the width, the height or the count of elements in the probability map may be the same as the width, the height or the count of elements in corresponding intermediate feature, respectively. Thus, each element in the probability map may correspond to each element of the intermediate feature one-to-one. For example, the first probability map may have the same size as the first intermediate feature, and the second probability map may have the same size as the second intermediate feature, which may facilitate subsequent fusion calculations. For example, assuming that the size of the first intermediate feature is 3×3×10, the size of the first probability map may be 3×3×1.

In some embodiments, $m_I$ denotes the first probability map, and $m_{I_k}$ denotes the second probability map. The first probability map $m_I$ may be obtained by converting (e.g., reducing) the dimension (e.g., the 3 dimensions) of the first intermediate feature $F'_I$ to one dimension using a 3×3 convolutional layer and then normalizing elements of the one-dimensional $F^*_I$ to [0,1] using an activation layer. That is, the range of an element value of each element in the first probability map may be [0, 1]. The second probability map $m_{I_k}$ may be obtained by converting (e.g., reducing) the dimension (e.g., the 3 dimensions) of the second intermediate feature $F'_{I_k}$ to one dimension using the 3×3 convolutional layer and then normalizing elements of the one-dimensional the $F'_{I_k}$ to [0,1] using the activation layer. An activation function of the activation layer may be sigmoid.

The processing device may perform the fusion on the first intermediate feature and the second intermediate feature based on the first probability map and the second probability map to obtain the semantic feature. For example, the process of the fusion may be as shown in the following formula (1):

$$F_a=m_I \cdot F'_I+m_{I_k} \cdot F'_{I_k}, \tag{1}$$

where, $F_a$ denotes the semantic feature, $m_I$ denotes the first probability map, $m_{I_k}$ denotes the second probability map, $F'_I$ denotes the first intermediate feature, and $F'_{I_k}$ denotes the second intermediate feature. When determining $F_a$, each element in the probability map may be multiplied by each element of the corresponding feature. For example, a first element of the first probability map (the position coordinates of the first element are (1,1)) may be multiplied by a first element of the first intermediate feature (the element position coordinate is also (1,1)). The position coordinates (1, 1) may refer to a position of the first element in the first probability map. In some embodiments, positions of elements in the first probability map or the probability map may be represented by coordinates in X-axis and Y-axis. In the same way, assuming that a position of a second element of the first probability map is (1,2), the second element may be multiplied by a second element of the first intermediate feature (the element position is (1,2)). After each element is multiplied, the result of the multiplication between the first intermediate feature and the first probability map may be added to the result of the multiplication between the second intermediate feature and the second probability map to obtain the semantic feature $F_a$, where the semantic feature $F_a \in \mathbb{R}^{C \times H \times W}$, C denotes the feature dimension, H and W denote the height and width of the semantic feature respectively.

In this embodiment, by fusing the probability maps and the intermediate features, the intermediate features of different dimensions may be screened (according to the probability values of the elements in the intermediate feature corresponding to the probability map) and fused to obtain the semantic feature.

In 340, a target feature may be obtained based on the semantic feature.

In some embodiments, the target feature may include high-dimensional semantic information and low-dimensional detailed information obtained by processing the image features (e.g., the first image feature and the second image feature). The target feature may be used in an object segmentation network model for object segmentation.

In some embodiments, the processing device may obtain the target feature by performing detail enhancement based on the semantic feature. For example, the processing device may perform a detail enhancement operation based on the semantic feature with the high-dimensional semantic information and the basic feature with the low-dimensional detailed information to achieve a detail enhancement operation of the semantic feature and obtain the target feature. Merely by way of example, the processing device may obtain the target feature based on the semantic feature in the manner shown in the following embodiments.

In some embodiments, the processing device may obtain a difference feature based on the first intermediate feature and the second intermediate feature.

The difference feature between images (e.g., the first intermediate feature and the second intermediate feature) may reflect the difference between the images of different resolutions (e.g., the first intermediate feature and the second intermediate feature). The difference feature may be configured to simulate the degree of information loss in the up-sampling and down-sampling process.

In some embodiments, the processing device may obtain the difference feature by subtracting the second intermediate feature from the first intermediate feature. For example, the processing device may subtract the second intermediate feature from the first intermediate feature to obtain the difference feature, which may be expressed as $F_d=F'_I-F'_{I_k}$, where $F_d$ denotes the difference feature, $F'_I$ denotes the first intermediate feature, and $F'_{I_k}$ denotes the second intermediate feature.

In some embodiments, the processing device may obtain a result by subtracting the second intermediate feature from the first intermediate feature, perform a convolution operation on the result to obtain a convolution result, and designate the convolution result as the difference feature.

For example, the processing device may obtain difference information between the first intermediate feature and the second intermediate feature. The difference information may be the result of subtracting the second intermediate feature from the first intermediate feature.

The processing device may perform the convolution operation on the difference information to obtain the difference feature. For example, the obtaining of the difference feature may be expressed as $F_d=f(F'_I-F'_{I_k})$, where f(*) denotes a convolutional layer (or a convolutional function). In some embodiments, f(*) may be a convolutional layer with a convolution kernel size of 3×3.

Figure 5:
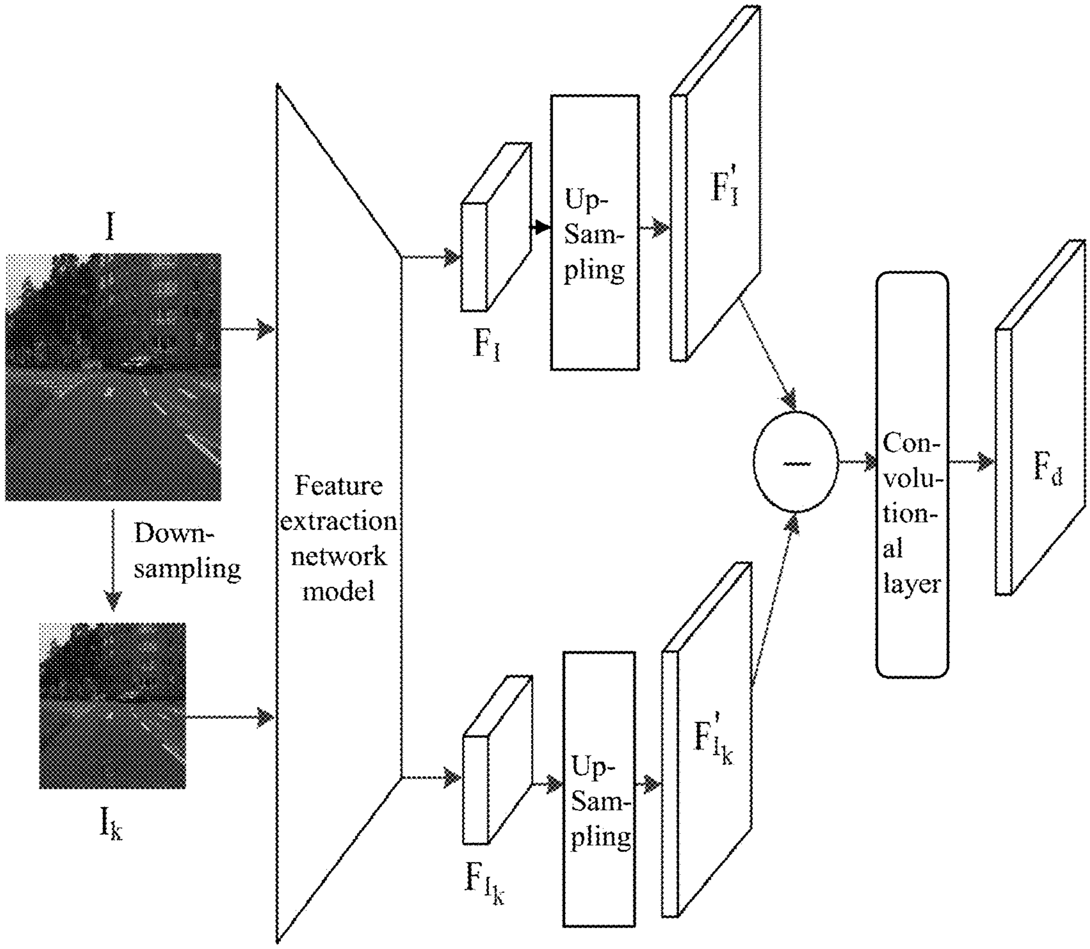
FIG. 5 is a schematic diagram illustrating an exemplary process for obtaining a difference feature according to some embodiments of the present disclosure.

For example, FIG. 5 shows a schematic diagram illustrating an exemplary process for obtaining a difference feature according to some embodiments of the present disclosure. As shown in FIG. 5, the minus sign "−" in FIG. 5 indicates that the second intermediate feature is subtracted from the first intermediate feature. For example, the first intermediate feature may include five elements: s1, s2, s3, s4, and s5; the second intermediate feature may include five elements: e1, e2, e3, e4, and e5. The difference feature may be obtained by subtracted a corresponding second intermediate feature from a first intermediate feature, such as, s1-e1, or s2-e2, or the like. The meanings of other symbols may be found in the above embodiments.

The processing device may obtain the target feature based on the difference feature and the semantic feature.

In some embodiments, the difference feature may be configured to guide the extraction of a basic feature from the image as described in connection with operation 210. The target feature may be obtained by combing the basic feature and the semantic feature.

In some embodiments, the processing device may obtain the basic feature based on the image.

The basic feature refers to a low-dimensional feature that contains details and other information extracted from an image.

In some embodiments, the processing device may perform a feature extraction operation on the image using a feature extraction network model to obtain the basic feature. In some embodiments, the processing device may perform a feature extraction operation on a down-sampled image of the image using the feature extraction network model to obtain the basic feature. The down-sampled image may be obtained by down-sampling the image. The richness of semantic information of the basic feature obtained by directly extracting the down-sampled image based on the feature extraction network model may be less than that of the first image feature. Compared with image information in a region with a certain size (e.g., a region with a size of 10*10 in the top left corner of the image) of the image, the down-sampled image may include different image information in a region with the certain size ((e.g., a region with a size of 10*10 in the top left corner of the down-sampled image). Thus, semantic information of the basic feature obtained by performing a feature extraction operation on the down-sampled image may be different from semantic information of the first image feature obtained by performing a feature extraction operation on the image.

In some embodiments, the processing device may perform a feature extraction operation on the image based on the feature extraction network model to obtain a first reference feature and perform a feature extraction operation on the down-sampled image of the image based on the feature extraction network model to obtain a second reference feature. The first reference feature and the second reference feature may be fused to obtain the basic feature. The richness of the semantic information of the basic feature obtained in this way may be less than that of at least one of the first image feature and the second image feature. For example, a down-sampled image may be obtained by down-sampling the image according to a third sampling magnification and another down-sampled image may be obtained by down-sampling the image according to a fourth sampling magnification. If the third sampling magnification is less than the fourth sampling magnification, the richness of the semantic information of the basic feature derived from the down-sampled image obtained by down-sampling the image according to the fourth sampling magnification may be less than the semantic information of the second image feature derived from the down-sampled image obtained by down-sampling the image according to the third sampling magnification.

The processing device may obtain the target feature by enhancing the details of the semantic feature based on the basic feature and the difference feature.

In some embodiments, detail enhancement may be understood as combining detailed information in the basic feature with the high-dimensional semantic feature (i.e., the semantic feature), so that the high-dimensional semantic feature may also contain rich detail information.

In some embodiments, the processing device may obtain the target feature by guiding the semantic feature to perform a detail enhancement operation based on the basic feature and the difference feature.

For example, the processing device may obtain an offset matrix based on the basic feature and the difference feature. The processing device may perform detailed enhancement on the semantic feature based on the offset matrix.

The offset matrix may include multiple elements each of which includes an element value (also referred to as an offset value). An element value of the offset matrix may be used as an offset value to offset an element position of the semantic feature. The size of the offset matrix may be the same as that of the semantic feature, and the offset value may reflect the distance of the offset position of the element relative to the element position of the element in the semantic feature.

In some embodiments, the processing device may obtain the offset matrix by performing fusion and convolution processing on the basic feature and the difference feature.

For example, the processing device may obtain a fused feature by performing a fusion operation on the basic feature and the difference feature. The fusion of the basic feature and the difference feature may be to cascade the basic feature and the difference feature. For example, if the basic feature is 15-dimension and the difference feature is 10-dimensions, the fused feature may be 25-dimension. The processing device may obtain a convolved feature by performing a convolution operation based on the fused feature. For example, 1*1 convolutional layers and 3*3 convolutional layers may be used for convolution. The purpose of the convolution may be to reduce the dimensionality of the fused feature, and the convolved feature may be expressed as $F_c (F_c \in \mathbb{R}^{C\times H\times W})$. The convolved feature $F_c$ may be convolved again. For example, a 1×1 convolution layer may be used to process the convolved feature $F_c$ to obtain the offset matrix M $(M \in \mathbb{R}^{2\times H\times W})$. The dimension of the offset matrix M may be 2. Since the semantic feature $F_a \in \mathbb{R}^{C\times H\times W}$, where C denotes the dimension of the semantic feature, H and W denote the height and width of the semantic feature, the element position of each semantic feature may be expressed in two-dimensional form. When offsetting the element position of the element in the semantic feature, the position of the element after being offset (i.e., the offset position) may be determined by determining the position of the element (i.e., the element position) in an H direction and a W direction (also be understood as the x-direction and the y-direction). Therefore, if the offset matrix is 2-dimension, one dimension of the 2-dimension of the offset matrix may be used to determine the position of the element in the H direction after being offset, and the other dimension of the 2-dimension of the offset matrix may be used to determine the position of the element in the W direction after being offset.

As shown in the foregoing embodiments, the processing device may perform detailed enhancement on the semantic feature based on the offset matrix. The offset matrix is obtained based on the basic feature and the difference feature, and the difference feature may guide the extraction of the low-dimensional basic feature (i.e., the basic feature). Therefore, by guiding the element values of the semantic feature to perform the position offset through the offset matrix, the basic detailed information in the basic feature may be combined into the high-dimensional semantic feature (i.e., the semantic feature).

In some embodiments, the processing device may obtain position-corresponding elements in the offset matrix and the semantic feature. For each element in the semantic feature, the processing device may obtain an element in the offset matrix corresponding to the element in the semantic feature in the offset matrix. The element in the offset matrix and the corresponding element in the semantic feature may also be referred to as two position-corresponding elements in the offset matrix and the semantic feature.

Two position-corresponding elements in the offset matrix and the semantic feature refer to two elements with the same position coordinates in the offset matrix and the semantic feature. For example, an element with the coordinates (1,1) in the offset matrix and an element with the coordinate (1,1) in the semantic feature are two position-corresponding elements. As another example, an element with the coordinate (1,2) in the offset matrix and an element with the coordinate (1,2) in the semantic feature are two position-corresponding elements.

In some embodiments, the processing device may obtain the position-corresponding elements based on the coordinates of elements in the offset matrix and the semantic feature.

In some embodiments, the processing device may obtain the target feature by offsetting the positions of the elements in the semantic feature based on the offset matrix M according to the following formula (2):

$$F_E(i,j)=F_a(i+M[0,i,j],j+M[1,i,j]), \quad (2)$$

where, $F_E$ denotes the target feature, $F_E \in \mathbb{R}^{C\times H\times W}$, $F_a$ denotes the semantic feature, (i, j) denotes the coordinates of the elements in the semantic feature, i=0, 1, 2, . . . , W−1; j=0, 1, 2, . . . , H−1, H and W denote the height and width of the semantic feature respectively. The above formula (2) may be understood as using the element values in the semantic feature $F_a$ as the input values and using the element values in the offset matrix M as the offset distances to perform the offset operation, and the target feature $F_E \in \mathbb{R}^{C\times H\times W}$ may be obtained.

In some embodiments of this specification, the process of obtaining the target feature may include inputting the obtained image into the feature extraction network model to extract the features (e.g., the first image feature, the second image feature, the basic feature). In the process of extracting the features, the shallow feature (i.e., basic feature) $F_L$ and the high-dimension features (the first image feature $F_I$, the second image feature $F_{I_k}$) may be obtained. Further, the difference feature $F_d$ may be obtained based on the first image feature and the second image feature. Then the high-dimension feature (i.e., semantic feature) may be enhanced in detail, and the enhanced target feature $F_E$ may be obtained. Segmentation based on the target feature $F_E$ may obtain more accurate segmentation results.

Figure 6:
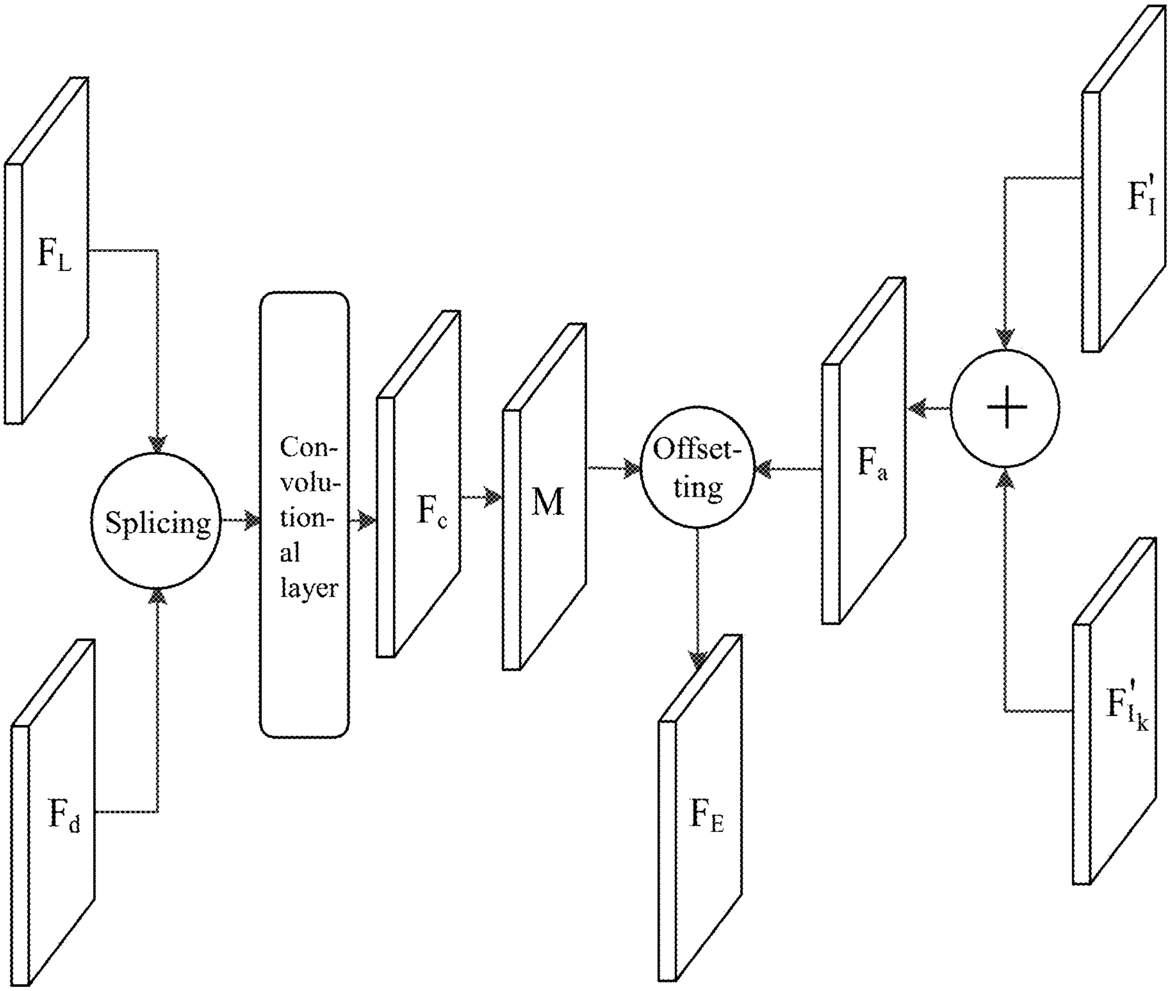
FIG. 6 is a schematic diagram illustrating an exemplary process for obtaining a target feature according to some embodiments of the present disclosure.

For example, FIG. 6 shows a schematic diagram illustrating an exemplary process for obtaining a target feature according to some embodiments of the present disclosure. As shown in FIG. 6, the symbol "+" in FIG. 6 indicates the fusion of the first intermediate feature $F'_I$ and the second intermediate feature $F'_{I_k}$. The meaning of each symbol in FIG. 6 may be found elsewhere in the present disclosure. As shown in FIG. 6, a basic feature $F_L$ and a difference feature $F_d$ may be cascaded in a certain dimension to obtain a first fusion feature, a first convolution feature $F_C$ may be obtained by performing a convolution operation on the first fusion feature, and the offset matrix may be obtained by processing the first convolution feature $F_C$ based on 1*1 convolutional layer. A first intermediate feature $F'_I$ may be fused with a second intermediate feature $F'_{I_k}$ to obtain a semantic feature $F_a$. Offsetting shown in FIG. 6 may refer to an offset operation performed on the elements of the semantic feature based on the elements of the offset matrix.

In some embodiments, the elements of the semantic feature may be used as the elements to be offset, and the element values in the offset matrix may be used as the offset distances to perform the offset operation on the elements of the semantic feature. The target feature with enhanced details may be obtained. On the basis of the difference feature learned in the above embodiments, semantic information and detailed information may be purposefully enhanced while the negative impact on high-dimension feature expression during feature fusion may be reduced, thereby effectively improving the segmentation accuracy of subsequent target segmentation tasks.

FIG. 4 is a flowchart illustrating an exemplary process for obtaining a target feature according to some embodiments of the present disclosure. In some embodiments, the process 400 may be executed by a processing device (e.g., the processing device 112). For example, the process 400 may be stored in a storage device (such as a built-in storage unit of the processing device or an external storage device) in the form of a program or an instruction. When the program or instruction is executed, the process 400 may be implemented. The process 400 may include the following operations.

In 410, a difference feature may be obtained based on the first feature and the second feature.

In some embodiments, the processing device may obtain the difference feature based on the first image feature and the second image feature in the same or similar way as obtaining the difference feature based on the first intermediate feature and the second intermediate feature. More descriptions regarding operation 410 may be found elsewhere in the present disclosure, for example, operation 330 in FIG. 3 and the descriptions thereof.

In 420, a basic feature may be obtained based on an image.

More descriptions regarding operation 420 may be found elsewhere in the present disclosure, for example, operation 240 in FIG. 2 and operation 340 in FIG. 3 and the descriptions thereof.

In 430, a target feature may be obtained by performing an enhancement operation on the first image feature based on the basic feature and the difference feature.

In some embodiments, the processing device may obtain the target feature based on the basic feature and the difference feature in the same or similar way as enhancing the semantic feature based on the basic feature and the difference feature as described in FIG. 3. More descriptions regarding operation 430 may be found elsewhere in the present disclosure, for example, FIG. 3 and the descriptions thereof.

In this embodiment, by obtaining the difference information between the first image feature and the second image feature, using the difference information to guide the extraction of low-dimensional basic feature, the details of the first image feature may be enhanced, which may also achieve the purpose of enriching the detail information of the image feature and improve the accuracy of subsequent target segmentation.

More descriptions regarding the first image feature, the second image feature, the difference feature, etc., may be found elsewhere in the present disclosure, for example, FIG. 2 and FIG. 3 and the descriptions thereof.

In some embodiments, the processing device may up-sample the first image feature, obtain the semantic feature based on the up-sampled result, and then perform detail enhancement on the semantic feature (in the same or similar way as the detail enhancement described in FIG. 2 and FIG. 3). As another example, the processing device may directly perform detail enhancement based on the first image feature (in the same or similar way as the detail enhancement described in FIG. 2 and FIG. 3).

It should be noted that the above descriptions are merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the relevant operations in the present disclosure may be changed, such as adding a pre-processing operation and a storage operation.

Figure 7:
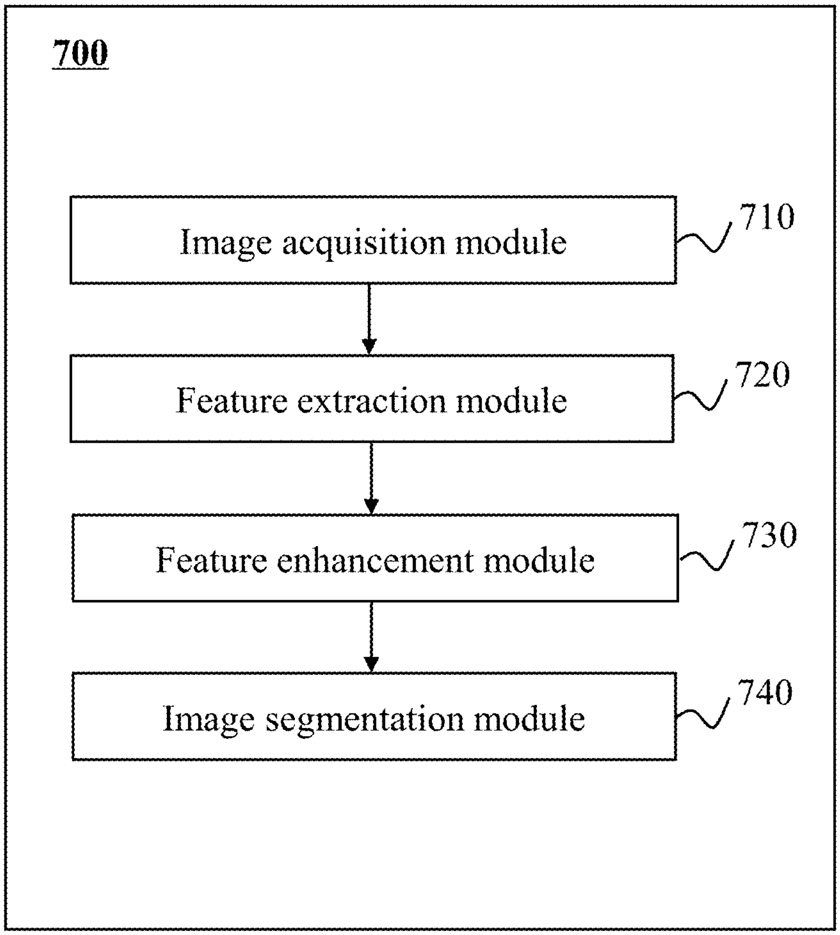
FIG. 7 is block diagram illustrating an exemplary process for processing an image according to some embodiments of the present disclosure.

FIG. 7 is a block diagram illustrating an exemplary process for processing an image according to some embodiments of the present disclosure. As shown in FIG. 7, a system 700 may include an image acquisition module 710, a feature extraction module 720, a feature enhancement module 730, and an image segmentation module 740.

In some embodiments, the image acquisition module 710 may be used to obtaining an image.

In some embodiments, the feature extraction module 720 may be used to obtain a first image feature by performing a feature extraction operation on the image, down-sample the image to obtain a down-sampled image, and obtain a second image feature by performing a feature extraction operation on the down-sampled image.

In some embodiments, the feature enhancement module 730 may be used to obtain, based on the first image feature and the second image feature, a target feature.

In some embodiments, the image segmentation module 740 may be used to performing a segmentation operation on the image based on the target feature.

Key words involved in the present disclosure may be described as follows:

Image segmentation: segmenting an image into several non-overlapping sub-regions. A sub-region may be similar with each other in the sub-regions in a certain extent, but different sub-regions may have obvious differences. The image segmentation may be the basic preprocessing of image recognition, scene understanding and object detection.

Shallow feature: a feature closer to an input end of the backbone network when the input image is performed on a feature extraction operation by the backbone network. For example, the backbone network includes a plurality of convolution layers, the feature obtained after inputting the input image into the first convolution layer or the second convolution layer may be the shallow feature.

High-dimension feature: a feature closer to an output end of the backbone network when the input image is performed on a feature extraction operation by the backbone network. For example, the feature obtained after inputting the input image into the last convolution layer or the penultimate convolution layer of the backbone network may be the high-dimension feature.

In order to polish the segmentation error caused by the splicing of shallow features and high-dimension features, a scheme may be provided in the present disclosure to improve the accuracy of target segmentation by enhancing the features. The scheme of the present disclosure may be described in detail below.

Figure 8:
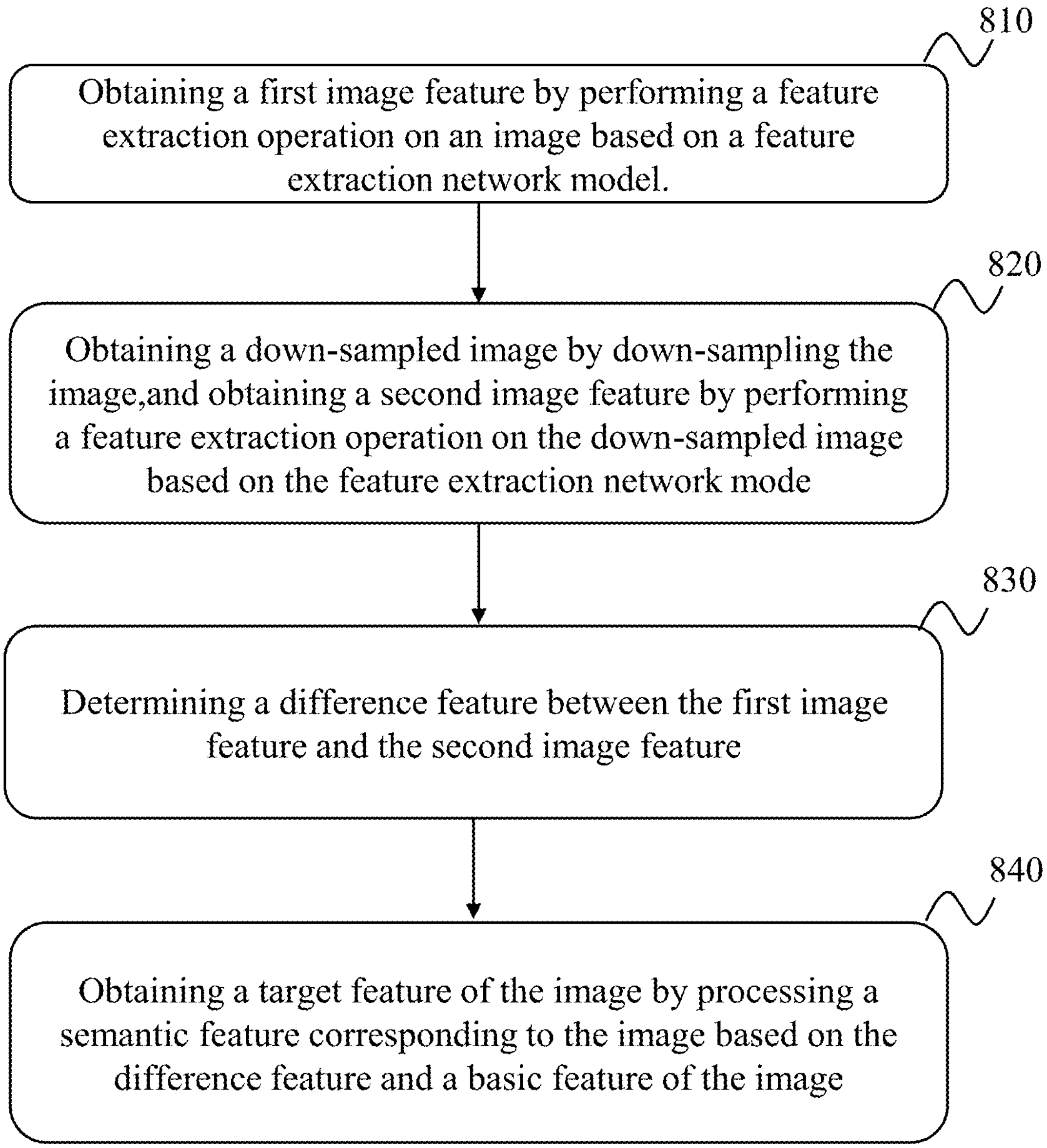
FIG. 8 is a flow diagram illustrating an exemplary method for feature enhancement according to some embodiments of the present disclosure.

FIG. 8 is a flow diagram of the feature enhancement method according to some embodiments of the present disclosure. The method may include:

In step 810 based on the feature extraction network model, performing feature extraction on an image to obtain the first image feature.

A picture taken by an imaging device may be used as an image, an image obtained from an image database may be used as an image, or an image transmitted from other devices may be used as an image. The image may be a color image or a gray image.

After acquiring the image, the image may be input into the pre-trained feature extraction network model, and the first image feature may be obtained by processing the image in the feature extraction network model. The feature extraction network model may be a network model with feature extraction function, such as residual networks (ResNets), high-resolution networks (HRNet) or twin networks.

In step 820: down-sampling the image, and extracting the features of the down-sampled image based on the feature extraction network model to obtain the second image feature.

After acquiring the image, the image may be down-sampled to generate the down-sampled image. For example, suppose that the size of the image I is M×N, and the image I is k times down-sampled, that is, all pixels in the k×k window become one pixel (for example, an average of this k×k pixels) to obtain the down-sampled image $I_k$. The size of the down-sampled image $I_k$ is (M/k)×(N/k). The second image feature is obtained by inputting the down-sampled image into the feature extraction network model.

In step 830: determining the difference feature between the first image feature and the second image feature.

After outputting the first image feature and the second image feature by the feature extraction network model, the first image feature and the second image feature may be directly subtracted to generate a difference feature. For example, the first image feature may be subtracted from the second image feature, and then other processing (such as at least one convolution processing or dimensionality reduction processing) may be performed to obtain the difference feature.

In step 840: based on the difference feature and the basic feature of the image, processing the semantic feature corresponding to the image to obtain the target feature of the image.

After obtaining the first image feature, the semantic feature may be generated by using the first image feature, that is, the feature is determined based on the first image feature. For example, the first image feature may be directly determined as the semantic feature. For example, the first image feature may be up-sampled, and the feature generated after up-sampling may be regarded as the semantic feature. For example, the first image feature and the second image feature are fused, and the fused feature is taken as the semantic feature. For example, the first image feature and/or the second image feature are up-sampled, and then fused to obtain the semantic feature.

The basic feature is obtained by feature extraction of at least one image of the image and the down-sampled image based on the sub-network in the feature extraction network model. Specifically, feature extraction may be performed on the image based on the sub-network to obtain the basic feature, and the richness of semantic information of the basic feature obtained in this way is less than that of the first image feature. The feature extraction may be performed on the down-sampled image based on the sub-network to obtain the basic feature, and the richness of the semantic information of the basic feature obtained in this way is less than that of the second image feature. The first reference feature may be obtained by feature extraction of the image based on the sub-network, and the second reference feature may be obtained by feature extraction of the up-sampled image based on the sub-network, and the first reference feature and the second reference feature may be fused to obtain the basic feature. The richness of the semantic information of the basic feature obtained in this way may be less than at least one of the first image feature and the second image feature.

After obtaining the difference feature and basic feature, the difference feature and basic feature are processed to generate a feature, the feature is processed to obtain the offset value, and the semantic feature is offset according to the offset value to obtain the feature value of the target feature. Specifically, the difference feature and the basic feature are fused to obtain the first fusion feature, and the semantic feature is offset by using the eigenvalue of the first fusion feature to obtain the target feature. For example, the difference feature and the basic feature are fused to obtain the first fusion feature, the first fusion feature may be convoluted twice to obtain the offset matrix, and the target feature may be obtained by offsetting the semantic feature based on offset value of the offset matrix.

This embodiment provides a scheme for enhancing the image features. Basic features are introduced to supplement the missing detailed information in the image features, the differences between input images with different resolutions are learned to simulate the degree of information loss in the up/down-sampling process, thereby supplementing the detailed information of the image features based on the learned information loss, and enhancing the extracted features. Therefore, the detailed information can be purposefully supplemented on the area with information loss, introducing unnecessary errors are avoided, and the image features are more accurate.

Figure 9:
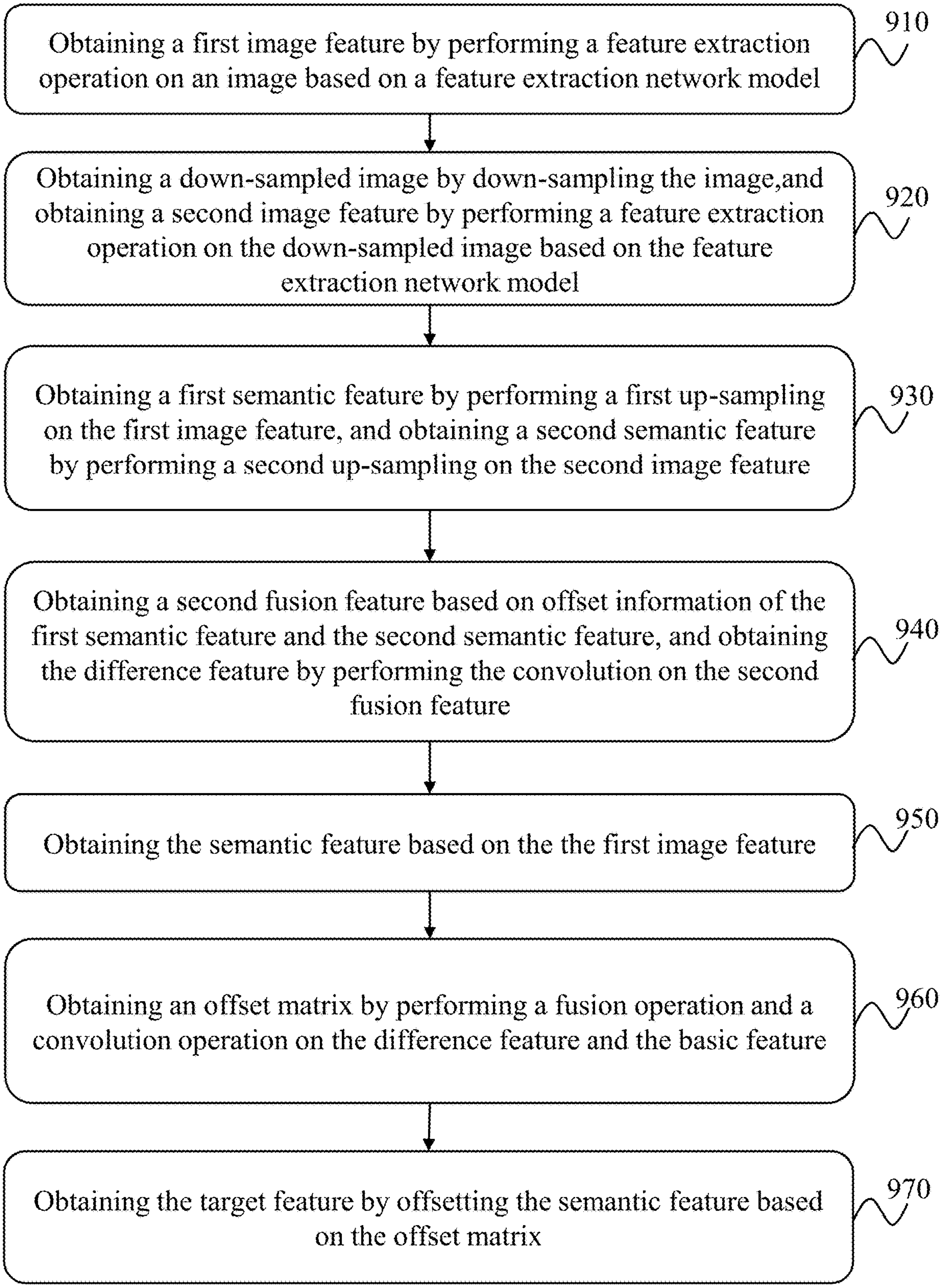
FIG. 9 is a flow diagram illustrating another exemplary method for the feature enhancement according to some embodiments of the present disclosure.

FIG. 9 is a flow diagram of another embodiment of the feature enhancement method provided by the present disclosure. The method may include:

In step 910: based on the feature extraction network model, performing a feature extraction operation on the image to obtain the first image feature.

The feature extraction network model may include N convolution layers in series, the sub-network includes the m-th convolution layer in the N convolution layers in series, N is an integer greater than 1, and m is a positive integer less than N. The basic feature is the feature output by the m-th convolution layer when the image is input into the feature extraction network model. When the image and the image after down-sampling are respectively input into the feature extraction network model, the basic feature is obtained by fusing the first basic feature output by the m-th convolution layer and the second basic feature output by the m-th convolution layer. When the down-sampled image is input into the feature extraction network model, the feature output by the m-th convolution layer. Specifically, the m-th convolution layer is the convolution layer close to the first convolution layer in all convolution layers. For example, assuming that the feature extraction network model including 7 convolution layers connected in turn, the value of m may be, but is not limited to, 2 or 3, that is, the basic feature may be, but is not limited to, the feature obtained after the image entering the feature extraction network model and passing through the second convolution layer/third convolution layer.

Further, the feature extraction network model may be a twin network sharing parameter, and its specific architecture and working principle are the same as the twin network in related technologies, which may not be repeated here.

In step 920: down-sampling the image, and extracting the features of the down-sampled image based on the feature extraction network model to obtain the second image feature.

Step 920 is the same as step 820 in the above embodiment and will not be repeated here.

In step 930: performing the first up-sampling on the first image feature to obtain the first semantic feature, and performing the second up-sampling on the second image feature to obtain the second semantic feature.

Figure 10:
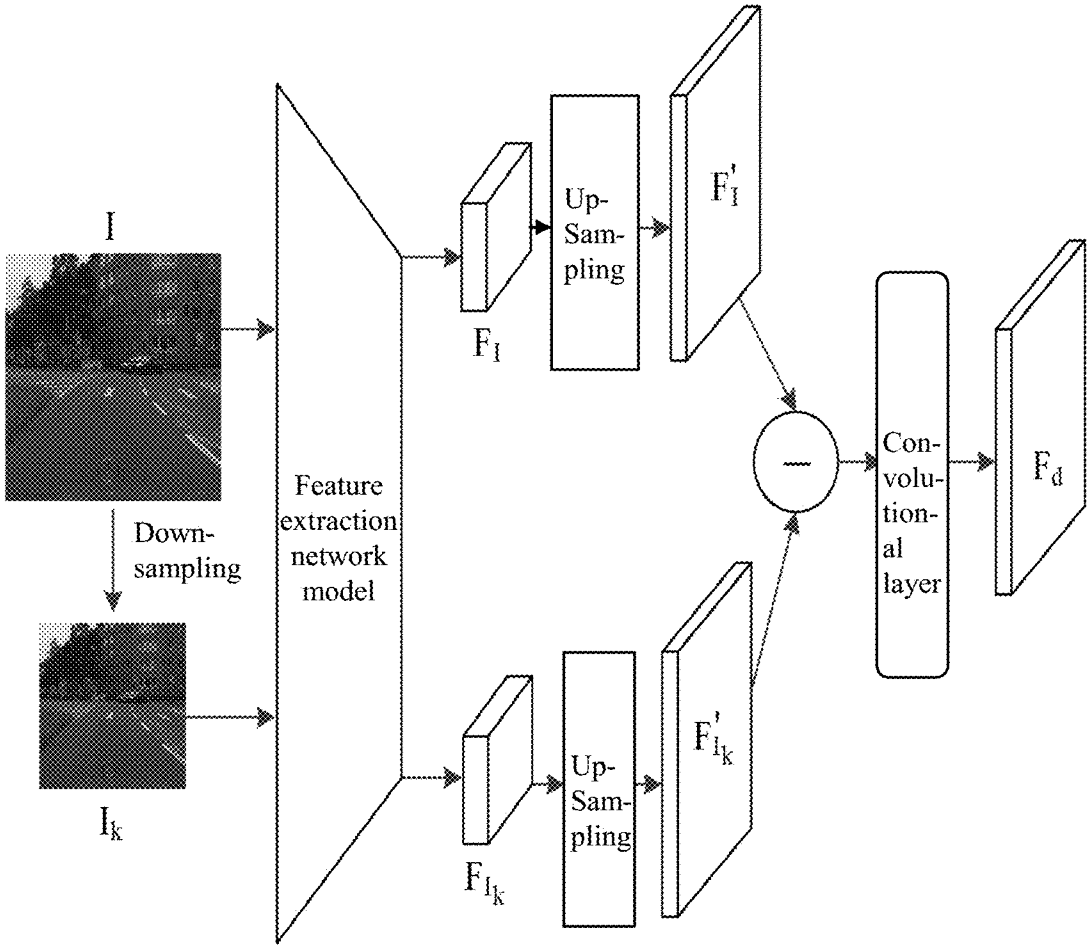
FIG. 10 is a schematic diagram illustrating an exemplary process for processing an image based on a feature extraction network and a difference learning network according to some embodiments of the present disclosure.

The sampling reference value of the first up-sampling is different from the sampling reference value of the second up-sampling, and the sampling reference value may be an up-sampling multiple. As shown in FIG. 10, the image I and the image $I_k$ after down-sampling are extracted through the same feature extraction network model, the first image feature $F_I$, and the second image feature $F_{I_k}$ are obtained respectively. Then, the first image feature $F_I$ and the second image feature $F_{I_k}$ are input into the difference learning networks. First, the first image feature $F_I$ and the second image feature $F_{I_k}$ are sampled to the same resolution to obtain the feature $F'_I$ and $F'_{I_k}$ for subsequent calculation.

Understandably, in other embodiments, only the first image feature or the second image feature may be up-sampled, that is, if the dimension of the first image feature is greater than that of the second image feature, the second image feature may be up-sampled to obtain the second semantic feature, so that the dimension of the second semantic feature is equal to that of the first image feature. If the dimension of the first image feature is smaller than that of the second image feature, the first image feature is up-sampled to obtain the first semantic feature so that the dimension of the first semantic feature is equal to that of the second image feature.

In step 940: obtaining the second fusion feature based on the offset information of the first semantic feature and the second semantic feature, and convoluting the second fusion feature to obtain the difference feature.

The first semantic feature may be subtracted from the second semantic feature to generate a difference feature. For example, the different feature may be obtained based on the following formula:

$$F_d=f(F'_I-F'_{I_k}) \tag{3}$$

where $F_d$ is the difference feature, and f ( ) refers to process based on the convolution kernel with a size of 3×3. As shown in FIG. 10, based on the offset information of the first semantic feature $F'_I$ and the second semantic feature $F'_{I_k}$, the second fusion feature may be obtained, and then the second fusion feature may be convoluted to obtain the difference feature $F_d$, for example, directly subtracting the first semantic feature $F'_I$ from the second semantic feature $F'_{I_k}$ to obtain the second fusion feature.

Through the above steps 910 to 940, twin network sharing parameters are realized to learn the differences between input images with different resolutions, to simulate the degree of information loss in the up/down-sampling process.

In step 950: determining the semantic feature based on the first image feature.

The semantic feature may be a first image feature, or may be obtained by up-sampling the first image feature. For example, the first image feature and the second image feature are fused to obtain the semantic feature. For another example, the first semantic feature and the second semantic feature are weighted and summed to obtain the semantic feature.

Figure 11:
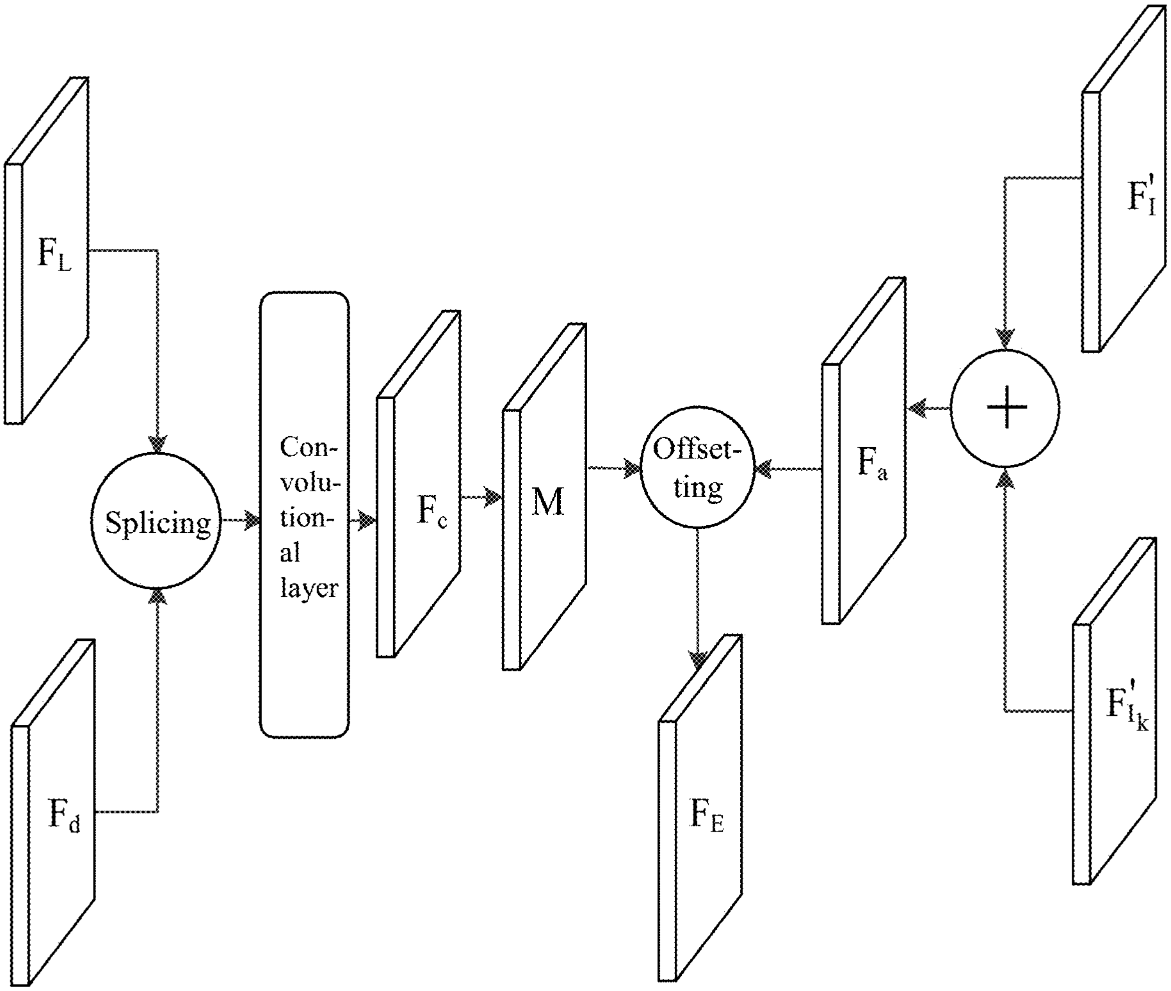
FIG. 11 is a schematic diagram illustrating an exemplary process for feature enhancement based on a detail enhancement network according to some embodiments of the present disclosure.

Further, as shown in FIG. 11, the semantic feature is enhanced by using the detail enhancement network. In order to enhance the semantic information, the first semantic feature $F'_I$ with different resolutions and the second semantic feature $F'_{I_k}$ with different resolutions are fused through the following formula to obtain the semantic feature $F_a$:

$$F_a = m_I \cdot F'_I + m_{I_k} \cdot F'_{I_k} \tag{4}$$

where $F_a \in \mathbb{R}^{C \times H \times W}$, C is the dimension of the semantic feature, H and W are the height and width of the semantic feature respectively, that is, the semantic feature $F_a$ includes a count of C of H×W two-dimensional matrix, $m_I$ is the probability map obtained from that the first semantic feature $F'_I$ reduces to 1-dimension by 3×3 convolution layer and then is normalized to [0,1] by the activation layer, and $m_{I_k}$ is the probability map obtained from that the second semantic feature $F'_{I_k}$ reduces to 1-dimension by 3×3 convolution layer, and is normalized to [0, 1] by the activation layer. The activation function of the activation layer may be sigmoid. Specifically, the size of the two probability maps matches the size of the first semantic feature, for example, if $F'_I$ is a data of 3×3×10, then $m_I$ is a probability map of 3×3×1.

By directly multiplying and adding the two probability maps with the corresponding positions of semantic features (including the first semantic feature and the second semantic feature), the semantic features of different scales are filtered and fused to obtain the semantic feature.

After obtaining the semantic feature, the detailed information of the semantic feature is enhanced, the extraction of the basic feature may be guided by the difference feature, and combined with the high-dimensional feature to obtain the target feature, as shown in steps 960 to 970.

In step 960: fusing and convoluting the difference feature and basic feature to obtain the offset matrix.

As shown in FIG. 11, the basic feature $F_L$ and the difference feature $F_d$ are fused to obtain the first fusion feature. Specifically, the basic feature $F_L$ and the difference feature $F_d$ may be cascaded to obtain the first fusion feature. For example, assuming that the dimension of the basic feature $F_L$ is 15 dimensions and the dimension of the difference feature $F_d$ is 10 dimensions, the first fusion feature is 25 dimensions. Then, the first fusion feature is convoluted to obtain the first convolution feature $F_c$($F_c \in \mathbb{R}^{C \times H \times W}$) Then, the first convolution feature $F_c$ is processed to obtain the offset matrix M. Specifically, a convolution layer 1×1 may be used to process the first convolution feature $F_c$ to obtain the offset matrix M (M ($M \in \mathbb{R}^{2 \times H \times W}$), that is, the dimension of offset matrix M is 3.

In step 970: performing offset processing on the semantic feature based on the offset matrix to obtain the target feature.

The semantic feature includes a plurality of first feature vectors, the offset matrix includes a plurality of offset values, and the dimension of the offset value is 2. The target feature includes a plurality of second feature vectors. The first feature vector at position [i+a, j+b] in the semantic feature is assigned to the second feature vector at position [i, j] in the target feature. Specifically, i and j are integers, and 0≤i≤(H−1), 0≤j≤(W−1), a is the first position adjustment parameter, b is the second position adjustment parameter, and the first position adjustment parameter. The first position adjustment parameter and the second position adjustment parameter are related to the offset value.

Further, the first position adjustment parameter is the offset value of position [0, i, j] in the offset matrix, and the second position adjustment parameter is the offset value of position [1, i, j] in the offset matrix, that is, the following formula is used to offset the semantic feature based on the offset matrix:

$$F_E(i,j) = F_a(i+M[0,i,j],\, j+M[1,i,j]) \tag{5}$$

where is the target feature $F_E$ is the target feature, $F_E \in \mathbb{R}^{C \times H \times W}$, (i,j) may refer to a position of a coordinate, i=0, 1, 2, . . . , W−1; j=0, 1, 2, . . . , H−1.

The first feature vector is offset by using the first feature vector in the semantic feature as the element input value and the offset value in the offset matrix as the offset distance. Based on the different features learned in the previous step, the semantic information and detailed information may be purposefully enhanced, and the negative impact on the expression of high-level features during feature fusion may be reduced.

In this embodiment, the difference analysis of the features extracted from the same image with different resolutions is carried out through the twin network, and the basic features are purposefully extracted. When introducing the basic detailed information, the high-level features may be guided to refine the feature of the high-level features itself based on the basic information. There is no explicit combination of the basic features and the high-level features, to avoid introducing unnecessary errors, it may better avoid the interaction in the fusion process, to improve the accuracy of feature expression.

Figure 12:
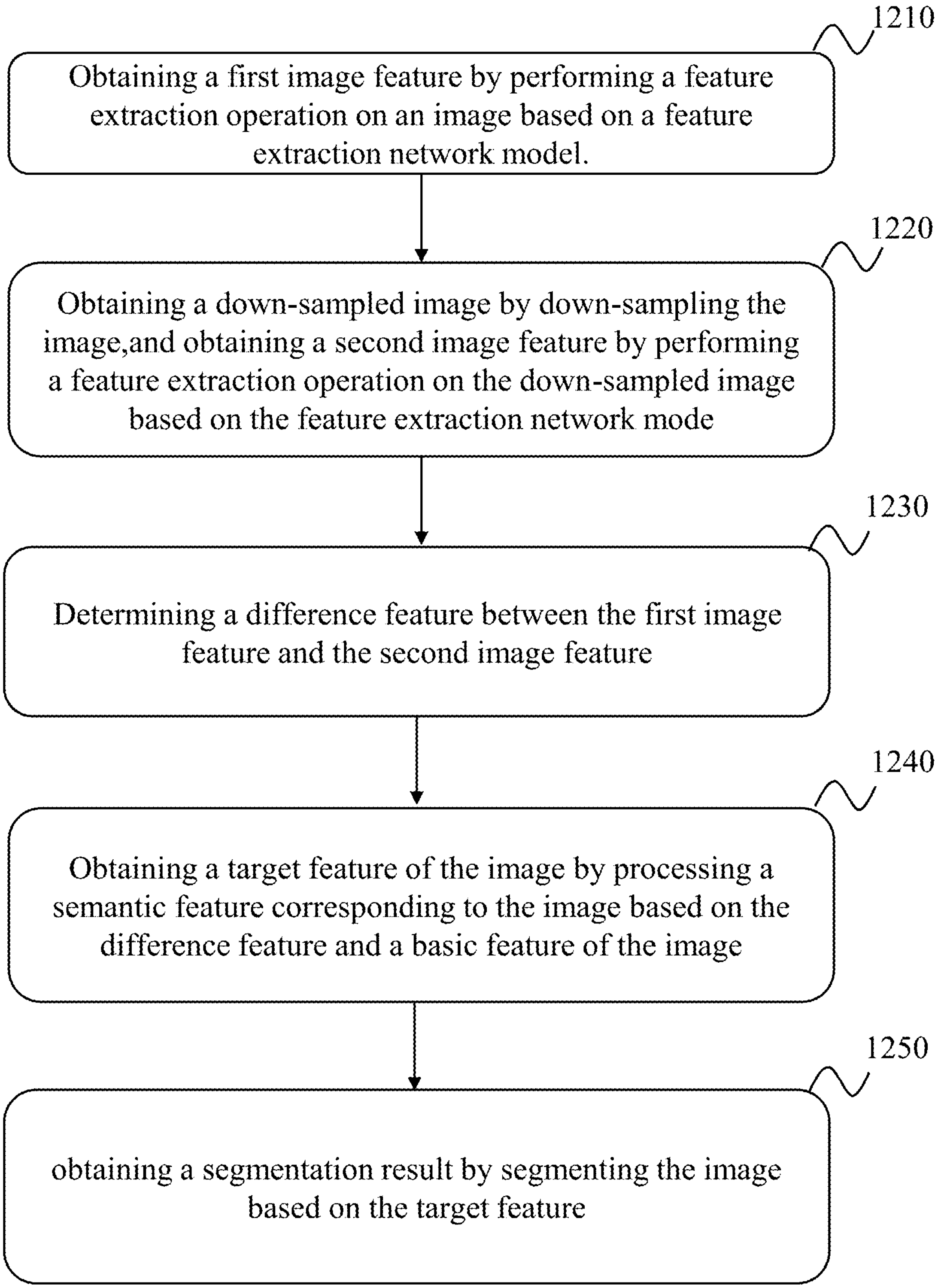
FIG. 12 is a flow diagram illustrating an exemplary method for target segmentation according to some embodiments of the present disclosure.

FIG. 12 is a flow diagram of an embodiment of the target segmentation method provided by the present disclosure. The method may include:

In step 1210: based on the feature extraction network model, performing a feature extraction operation on the image to obtain the first image feature.

In step 1220: down-sampling the image, and extracting the features of the down-sampled image based on the feature extraction network model to obtain the second image features.

In step 1230: determining the difference feature between the first image feature and the second image feature.

In step 1240: processing the semantic feature corresponding to the image based on the difference feature and the basic feature of the image to obtain the target feature of the image.

Steps 1210 to 1240 are the same as steps 810 to 840 in the above embodiment, and will not be repeated here.

In step 1250: segmenting the image based on the target feature to obtain the segmentation result.

Figure 13:
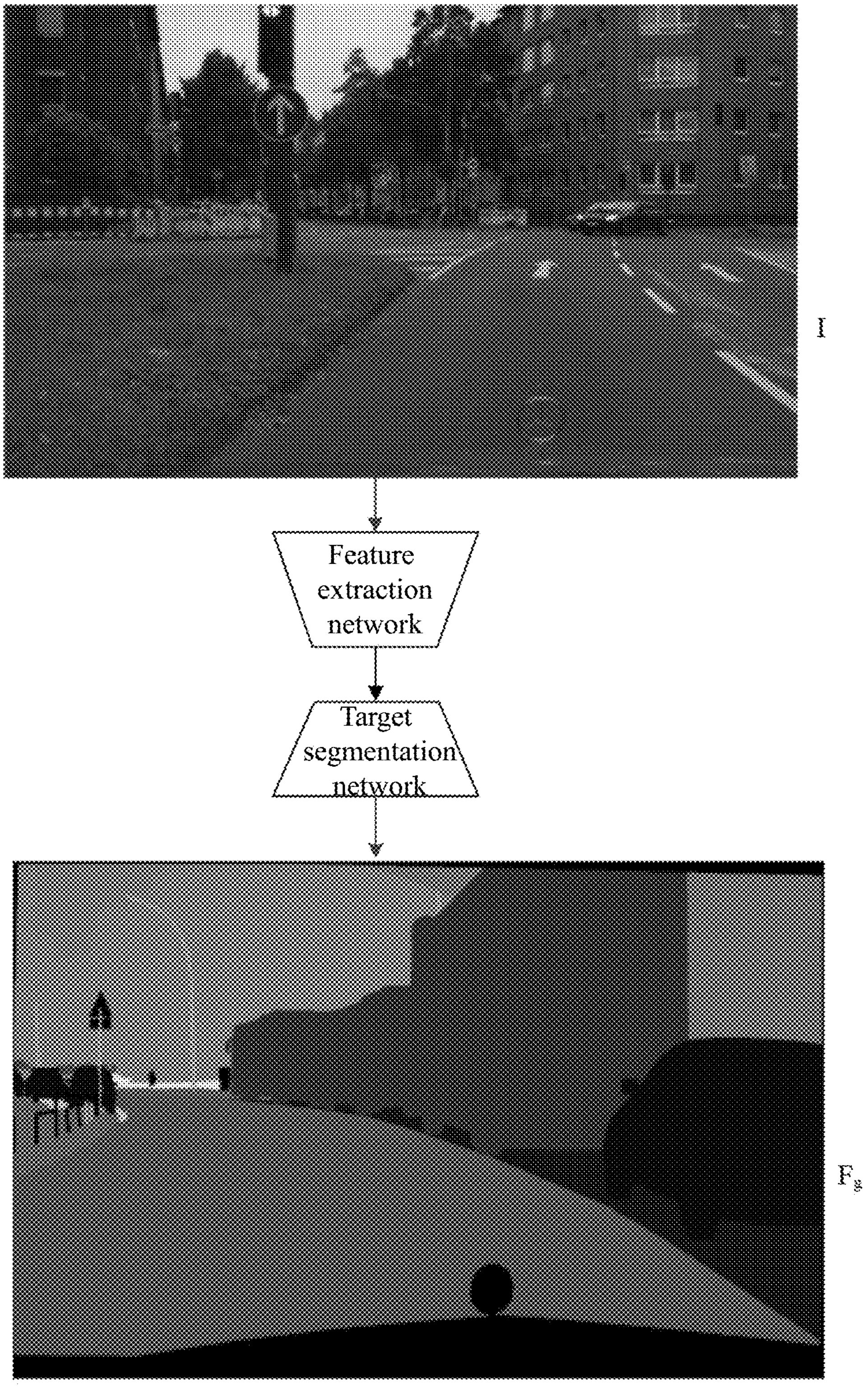
FIG. 13 is a schematic diagram illustrating an exemplary process for performing the target segmentation operation on the image according to some embodiments of the present disclosure.

After obtaining the target feature, the image is divided into several regions by using the target feature to generate the segmentation result. The segmentation scheme based on the target feature is the same as the existing scheme for target segmentation, which may not be repeated here. For example, as shown in FIG. 13, the image I is input into the feature extraction network model, the target segmentation network is used to process the basic features and high-level features output by the feature extraction network model to generate the target features, and the target features are processed to generate the segmentation result $F_g$.

The target segmentation scheme provided in this embodiment may be widely used in various image processing scenarios, such as but not limited to: in medicine, the target segmentation scheme may be used to measure the tissue volume in medical images, three-dimensional reconstruction or surgical simulation. In the remote sensing image, the target in the synthetic aperture radar image is segmented, different cloud systems and backgrounds in the remote sensing cloud image are extracted, and the roads and forests in the satellite image are located. Image segmentation may also be used as preprocessing to transform the initial image into several forms that are more convenient for computer processing. It not only retains the important feature information in the image but also effectively reduces the useless data in the image and improves the accuracy and efficiency of subsequent image processing. For example, in terms of communication, the contour structure and regional content of the target may be extracted in advance to ensure that useful information is not lost, and the image may be compressed pertinently to improve the network transmission efficiency. In the field of transportation, it may be used for contour extraction, recognition or tracking of vehicles, or pedestrian detection. Generally speaking, all the contents related to target detection, extraction, and recognition need to use image segmentation technology.

This embodiment provides a target segmentation method. First, the image to be segmented (including the image and the image after down-sampling) may be sent to the feature extraction network model to extract the features, and the basic features and high-level features may be obtained. The difference features may be obtained based on the image and down-sampled image. Then the details of the high-level features may be enhanced based on the difference features and basic features to obtain the enhanced features. Then, the features may be extracted based on the target features. Thus, the segmentation result may be obtained, and the accuracy of target segmentation may be improved.

Figure 14:
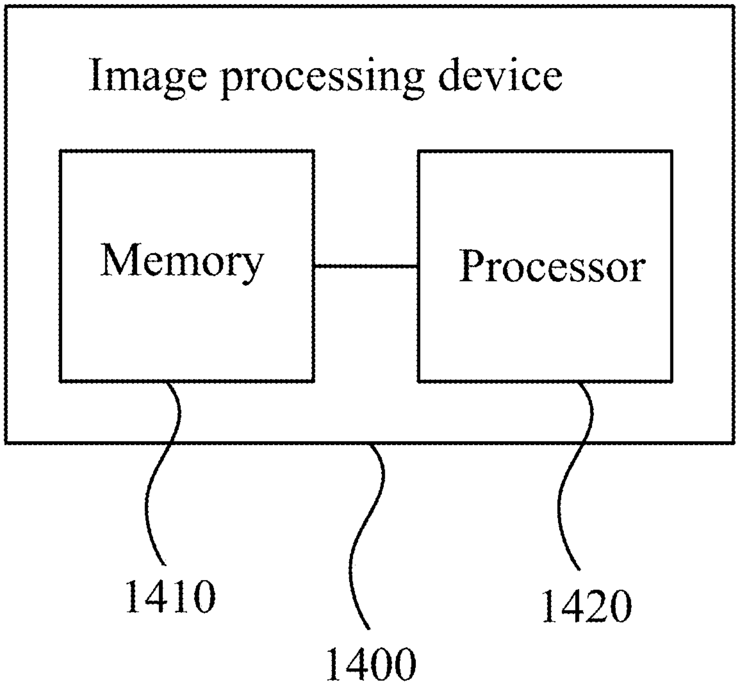
FIG. 14 is a structure diagram illustrating an exemplary image processing device according to some embodiments of the present disclosure.

FIG. 14 is a structure diagram of an embodiment of the image processing device provided by the present disclosure. The image processing device 1400 includes an interconnected memory 1410 and a processor 1420, wherein the memory 1410 is used to store a computer program, and the computer program is used to realize the method of feature enhancement in the above embodiment when executed by the processor 1420, and/or implement the target segmentation method in the above embodiment.

Figure 15:
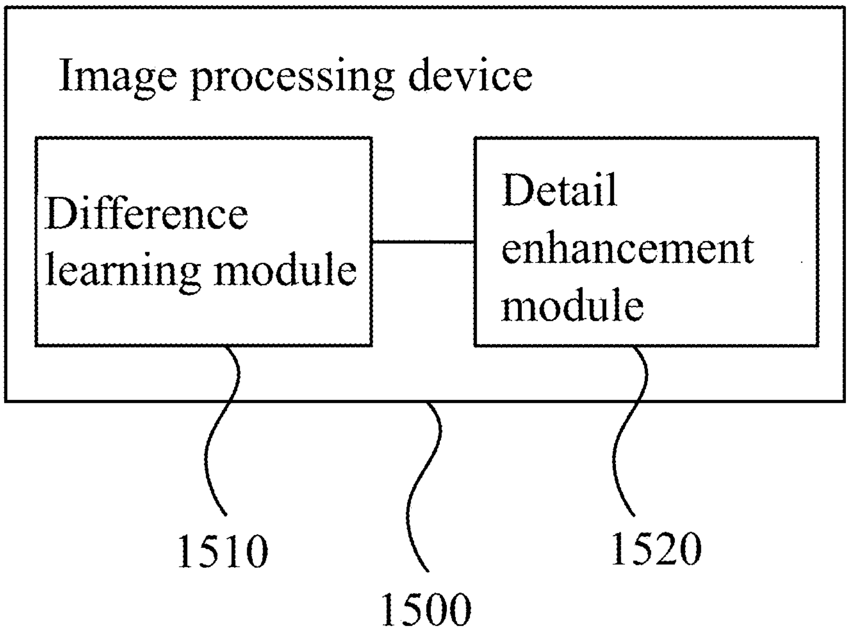
FIG. 15 is a structure diagram illustrating another exemplary image processing device according to some embodiments of the present disclosure.

FIG. 15 is a structural diagram of another embodiment of the image processing device provided by the present disclosure. The image processing device 1500 includes a difference learning module 1510 and a detail enhancement module 1520.

The difference learning module 1510 is used for feature extraction of the image based on the feature extraction network model to obtain the first image feature. The image is down-sampled, and the feature of the down-sampled image is extracted based on the feature extraction network model to obtain the second image feature. The difference feature between the first image feature and the second image feature is determined.

The detail enhancement module 1520 is connected with the difference learning module 1510, which is used to process the semantic feature corresponding to the image based on the difference feature and the basic feature of the image to obtain the target feature of the image. Specifically, the semantic feature is determined based on the first image feature. The basic feature is obtained by feature extraction of at least one image of the image and the down-sampled image based on the sub-network in the feature extraction network model.

In some embodiment, the difference learning module 1510 may be also used to determine the first image feature as the semantic feature. For example, the first image feature may be up-sampled to obtain the semantic feature. For another example, the first image feature and the second image feature may be fused to obtain the semantic feature.

In another specific embodiment, the feature extraction network model includes N convolution layers in series, and the sub-network includes the m-th convolution layer among the N convolution layers in series, where n is an integer greater than 1 and m is a positive integer less than N.

In another embodiment, the detail enhancement module 1520 may be used to fuse and convolute the difference feature and the basic feature to obtain the offset matrix. Based on the offset matrix, the semantic feature may be offset to obtain the target feature.

In another embodiment, the basic feature and the difference feature may be fused based on the detail enhancement module 1520 to obtain the first fusion feature. Convolution processing is performed on the first fusion feature to obtain the first convolution feature; The first convolution feature is convoluted to obtain the offset matrix.

In another embodiment, the semantic feature includes a plurality of first feature vectors, the offset matrix includes a plurality of offset values, the target feature includes a plurality of second feature vectors, and the detail enhancement module 1520 is also used to assign the first feature vector at position [i+a, j+b] in the semantic feature to the second feature vector at position [I, j] in the target feature, where i and j are integers, and $0 \le i \le (H-1)$, $0 \le j \le (W-1)$, W is the width of the semantic feature, H is the height of the semantic feature, a is the first position adjustment parameter, b is the second position adjustment parameter, and the first position adjustment parameter and the second position adjustment parameter are related to the offset value.

In another embodiment, the first position adjustment parameter is the offset value of position [0, i, j] in the offset matrix, and the second position adjustment parameter is the offset value of position [1, i, j] in the offset matrix.

In another embodiment, the basic feature and the difference feature may be cascaded based on the detail enhancement module 1520 to obtain the first fusion feature.

In another embodiment, the difference learning module 1510 is also used for first up-sampling the first image feature to obtain the first semantic feature; and performing a second up-sampling on the second image feature to obtain a second semantic feature. The sampling reference value of the first up-sampling may be different from the sampling reference value of the second up-sampling. A second fusion feature may be obtained based on the offset information of the first semantic feature and the second semantic feature. The second fusion feature may be convoluted to obtain the difference feature.

In the embodiment, the image processing device includes a difference learning module and a detail enhancement module. Thus, the features may be up-sampled after performing the feature extraction, and the low-dimensional expression may be performed on the target features. Compared with the ordinary up-sampling module, by simulating the information loss in the sampling process, the detailed information can be purposefully supplemented on the area with information loss. Therefore, the missing detailed information can be supplemented, the accuracy of feature expression can be improved, and the accuracy of target segmentation can be improved.

Figure 16:
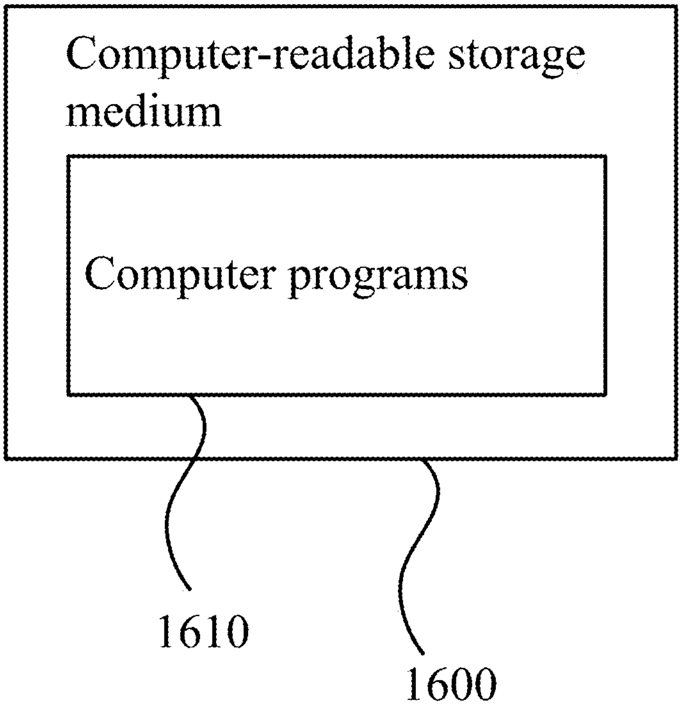
FIG. 16 is a structure diagram illustrating another exemplary computer-readable storage medium according to some embodiments of the present disclosure.

FIG. 16 is a structure diagram of an embodiment of the computer-readable storage medium provided by the present disclosure. The computer-readable storage medium 1600 is used to store the computer programs 1610. When the computer programs 1610 is executed by the processor, the method of feature enhancement in the above embodiment may be performed, or the target segmentation method in the above embodiment may be performed.

The computer-readable storage medium 1600 may be a server, a USB flash disk, a mobile hard disk, a read-only memory (ROM), a random access memory (RAM), a magnetic disc, or an optical disc, and other media that may store program codes.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for processing an image, comprising:

at least one storage device including a set of instructions; and at least one processor configured to communicate with the at least one storage device, wherein when executing the set of instructions, the at least one processor is configured to direct the system to perform operations including:

obtaining an image;

obtaining a first image feature by performing a feature extraction operation on the image;

obtaining a down-sampled image by down-sampling the image;

obtaining a second image feature by performing a feature extraction operation on the down-sampled image;

obtaining a first intermediate feature by up-sampling the first image feature;

obtaining a second intermediate feature by up-sampling the second image feature;

obtaining a semantic feature by performing a fusion operation on the first intermediate feature and the second intermediate feature;

obtaining a difference feature based on the first intermediate feature and the second intermediate feature;

obtaining a target feature based on the difference feature and the semantic feature; and performing a segmentation operation on the image based on the target feature.

2. The system of claim 1, wherein the obtaining a semantic feature by performing a fusion operation on the first intermediate feature and the second intermediate feature comprises:

obtaining a first probability map corresponding to the first intermediate feature and a second probability map corresponding to the second intermediate feature; and obtaining the semantic feature by performing a weighted summation on the first intermediate feature and the second intermediate feature based on the first probability map and the second probability map.

3. The system of claim 1, wherein the obtaining a difference feature based on the first intermediate feature and the second intermediate feature comprises:

obtaining difference information between the first intermediate feature and the second intermediate feature; and obtaining the difference feature by performing a convolution operation on the difference information.

4. The system of claim 1, wherein the obtaining the target feature based on the difference feature and the semantic feature comprises:

obtaining a basic feature based on the image; and obtaining the target feature by performing a detail enhancement operation on the semantic feature based on the basic feature and the difference feature.

5. The system of claim 4, wherein the performing a detail enhancement operation on the semantic feature based on the basic feature and the difference feature comprises:

obtaining an offset matrix based on the basic feature and the difference feature; and performing the detail enhancement operation on the semantic feature based on the offset matrix.

6. The system of claim 5, wherein the performing the detail enhancement operation on the semantic feature based on the offset matrix comprises:

for each element in the semantic feature, obtaining an element in the offset matrix corresponding to the element in the semantic feature, the element in the offset matrix and the corresponding element in the semantic feature having the same position coordinates in the offset matrix and the semantic feature; and obtaining the target feature by offsetting an element position of the element in the semantic feature based on an element value of the corresponding element in the offset matrix.

7. A method for processing an image implemented on a computing device including at least one processor and a storage device, comprising:

obtaining an image;

obtaining a first image feature by performing a feature extraction operation on the image;

obtaining a down-sampled image by down-sampling the image;

obtaining a second image feature by performing a feature extraction operation on the down-sampled image;

obtaining a first intermediate feature by up-sampling the first image feature;

obtaining a second intermediate feature by up-sampling the second image feature;

obtaining a semantic feature by performing a fusion operation on the first intermediate feature and the second intermediate feature;

obtaining a difference feature based on the first intermediate feature and the second intermediate feature;

obtaining a target feature based on the difference feature and the semantic feature; and performing a segmentation operation on the image based on the target feature.

8. The method of claim 7, wherein the obtaining a semantic feature by performing a fusion operation on the first intermediate feature and the second intermediate feature comprises:

obtaining a first probability map corresponding to the first intermediate feature and a second probability map corresponding to the second intermediate feature; and obtaining the semantic feature by performing a weighted summation on the first intermediate feature and the second intermediate feature based on the first probability map and the second probability map.

9. The method of claim 7, wherein the obtaining a difference feature based on the first intermediate feature and the second intermediate feature comprises:

obtaining difference information between the first intermediate feature and the second intermediate feature; and obtaining the difference feature by performing a convolution operation on the difference information.

10. The method of claim 7, wherein the obtaining the target feature based on the difference feature and the semantic feature comprises:

obtaining a basic feature based on the image; and obtaining the target feature by performing a detail enhancement operation on the semantic feature based on the basic feature and the difference feature.

11. The method of claim 10, wherein the performing a detail enhancement operation on the semantic feature based on the basic feature and the difference feature comprises:

obtaining an offset matrix based on the basic feature and the difference feature; and performing the detail enhancement operation on the semantic feature based on the offset matrix.

12. The method of claim 11, wherein the performing the detail enhancement on the semantic feature based on the offset matrix comprises:

obtaining an element in the offset matrix corresponding to the element in the semantic feature, the element in the offset matrix and corresponding element in the semantic feature having the same position coordinates in the offset matrix and the semantic feature; and obtaining the target feature by offsetting an element position of the element in the semantic feature based on an element value of the corresponding element in the offset matrix.

13. The method of claim 7, wherein the obtaining, based on the first image feature and the second image feature, a target feature further comprises:

obtaining a difference feature based on the first image feature and the second image feature;

obtaining a basic feature based on the image; and obtaining the target feature by performing an enhancement operation on the first image feature based on the basic feature and the difference feature.

14. A non-transitory computer-readable medium, comprising at least one set of instructions, wherein when executed by at least one processor of a computer device, the at least one set of instructions directs the at least one processor to perform operations including:

obtaining an image;

obtaining a first image feature by performing a feature extraction operation on the image;

obtaining a down-sampled image by down-sampling the image;

obtaining a second image feature by performing a feature extraction operation on the down-sampled image;

obtaining a first intermediate feature by up-sampling the first image feature;

obtaining a second intermediate feature by up-sampling the second image feature;

obtaining a semantic feature by performing a fusion operation on the first intermediate feature and the second intermediate feature;

obtaining a difference feature based on the first intermediate feature and the second intermediate feature;

obtaining a target feature based on the difference feature and the semantic feature; and performing a segmentation operation on the image based on the target feature.

* * * * *